United States Patent
Park et al.

(10) Patent No.: US 9,740,040 B2
(45) Date of Patent: Aug. 22, 2017

(54) DISPLAY PANEL, DISPLAY APPARATUS HAVING THE SAME AND METHOD OF MANUFACTURING THE SAME

(71) Applicant: SAMSUNG DISPLAY CO., LTD., Yongin, Gyeonggi-Do (KR)

(72) Inventors: Ki-Soo Park, Chungcheongnam-do (KR); Yong-Il Kim, Gyeonggi-do (KR); Jai-Ho Kim, Seoul (KR); Sang-Sik Yang, Chungcheongnam-do (KR); Jong-Moon Heo, Daegu (KR); Kyoung-Duck Kim, Chungcheongnam-do (KR); Jong-Ho Won, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 127 days.

(21) Appl. No.: 14/338,670

(22) Filed: Jul. 23, 2014

(65) Prior Publication Data
US 2015/0185553 A1    Jul. 2, 2015

(30) Foreign Application Priority Data
Dec. 27, 2013 (KR) .......... 10-2013-0165934

(51) Int. Cl.
G02F 1/1335 (2006.01)
G02F 1/1333 (2006.01)

(52) U.S. Cl.
CPC .. *G02F 1/133524* (2013.01); *G02F 1/133308* (2013.01); *G02F 1/133509* (2013.01); *G02F 1/133512* (2013.01); *G02F 2001/133562* (2013.01)

(58) Field of Classification Search
CPC ......... G02F 1/133524; G02F 1/133308; G02F 1/133512; G02F 1/133509; G02F 2001/133562
USPC ........................................... 349/15
See application file for complete search history.

(56) References Cited

U.S. PATENT DOCUMENTS

| | | |
|---|---|---|
| 6,433,852 B1 | 8/2002 | Sonoda et al. |
| 7,417,373 B2 | 8/2008 | Yamazaki |
| 7,795,807 B2 | 9/2010 | Li |
| 8,054,554 B2 | 11/2011 | Park et al. |
| 8,284,330 B2 | 10/2012 | Lee et al. |
| 8,482,691 B2 | 7/2013 | Park et al. |

(Continued)

FOREIGN PATENT DOCUMENTS

| | | |
|---|---|---|
| KR | 1020050056430 | 6/2005 |
| KR | 1020090016971 | 2/2009 |
| KR | 1020130027204 | 3/2013 |

*Primary Examiner* — Charles Chang
(74) *Attorney, Agent, or Firm* — F. Chau & Associates, LLC

(57) ABSTRACT

A display panel includes a lower panel configured to display an image. The lower panel includes a plurality of unit pixels. A slit layer is disposed on the lower panel. The slit layer includes a first pattern configured to form a first slit corresponding to each of the plurality of unit pixels and a second pattern configured to form a second slit corresponding to the first slit. The slit layer is configured to project an image through the first slit and the second slit. A top layer is disposed on the slit layer. The top layer is larger than the lower panel in a plan view. The top layer is configured to have the image projected thereon.

17 Claims, 28 Drawing Sheets

(56) References Cited

U.S. PATENT DOCUMENTS

| | | |
|---|---|---|
| 2008/0242574 A1 | 10/2008 | Rath et al. |
| 2009/0109366 A1 | 4/2009 | Lippey |
| 2010/0271337 A1 | 10/2010 | Noh et al. |
| 2011/0134378 A1* | 6/2011 | Tsuboi .............. G02F 1/133512 349/110 |
| 2011/0211140 A1 | 9/2011 | Kim et al. |
| 2011/0235309 A1 | 9/2011 | Miki et al. |
| 2012/0080080 A1* | 4/2012 | Shalit ..................... G02B 5/223 136/252 |
| 2013/0017873 A1 | 1/2013 | Shepherd et al. |
| 2013/0082988 A1 | 4/2013 | Lee et al. |
| 2013/0235561 A1* | 9/2013 | Etienne ............. G02F 1/133308 362/97.1 |

\* cited by examiner

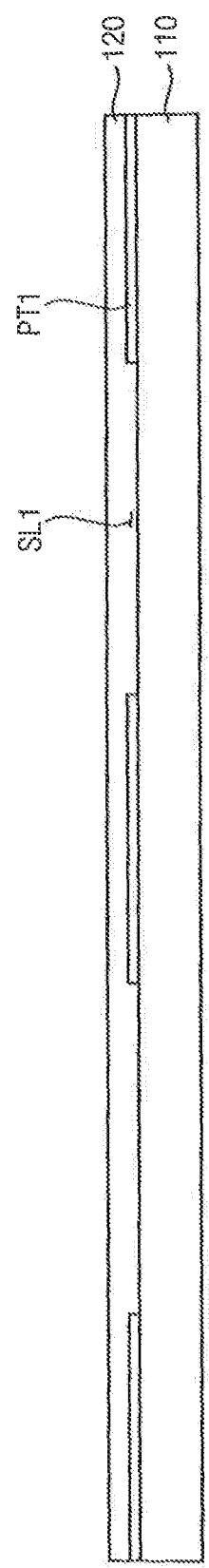

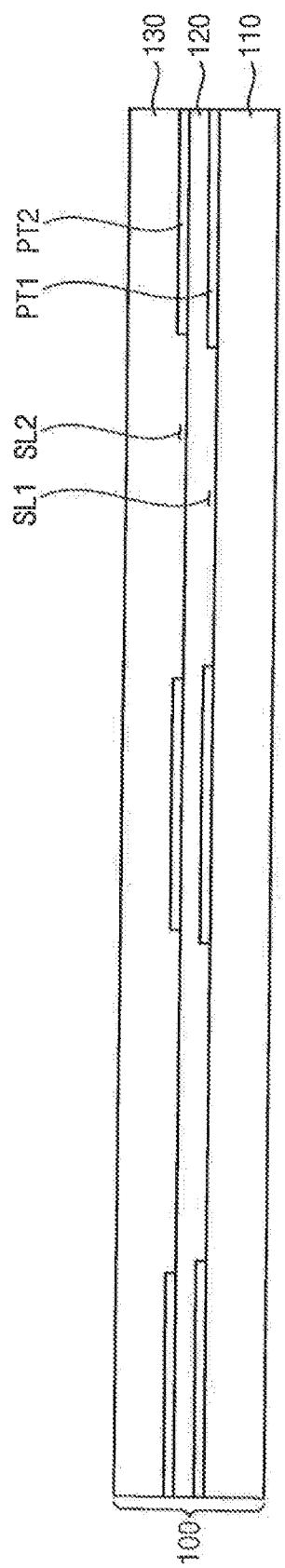

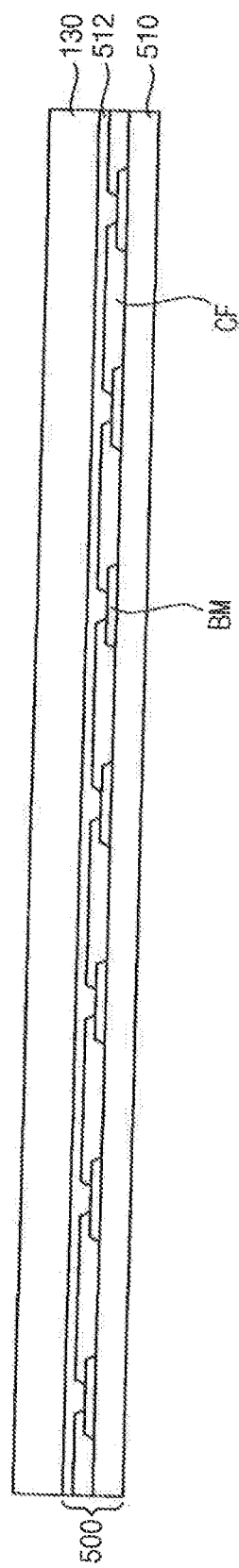

DISPLAY PANEL, DISPLAY APPARATUS HAVING THE SAME AND METHOD OF MANUFACTURING THE SAME

CROSS-REFERENCE TO RELATED APPLICATION

This application claims priority under 35 U.S.C. §119 to Korean Patent Application No. 10-2013-0165934, filed on Dec. 27, 2013, the disclosure of which is incorporated by reference herein in its entirety.

TECHNICAL FIELD

Exemplary embodiments of the present invention relate to a display panel, and more particularly to a display apparatus having the display panel, and a method of manufacturing the display panel.

DISCUSSION OF THE RELATED ART

Recently, display apparatuses having light weight and small size have been manufactured. A cathode ray tube (CRT) display apparatus has been used due to its performance and competitive price. However, the CRT display apparatus may lack small size or portability. Therefore display apparatuses such as a plasma display apparatuses, liquid crystal display apparatuses and an organic light emitting diode display apparatuses have been highly regarded due to their small size, light weight and low-power-consumption.

A display apparatus may include a display panel displaying an image. The display panel may include a display area on which the image is displayed, and a non-display area surrounding the display area and on which the image is not displayed. A bezel is a portion of the display apparatus which corresponds to the non-display area. For example, in multi-screen displays including a plurality of display panels, a non-display area between display areas might not display an image.

SUMMARY

One or more exemplary embodiments of the present invention provide a display panel for a bezelless display apparatus.

One or more exemplary embodiments of the present invention include the bezelless display apparatus.

According to an exemplary embodiment of the present invention, a display panel includes a lower panel configured to display an image. The lower panel includes a plurality of unit pixels. A slit layer is disposed on the lower panel. The slit layer includes a first pattern configured to form a first slit corresponding to each of the plurality of unit pixels. A second pattern is configured to form a second slit corresponding to the first slit. The slit layer is configured to project an image through the first slit and the second slit. A top layer is disposed on the slit layer. The top layer is larger than the lower panel in a plan view. The top layer is configured to have the image projected thereon.

In an exemplary embodiment, the lower panel may include a connecting terminal configured to receive a signal for driving the lower panel. The connecting terminal may be disposed on a peripheral area of the display panel. The peripheral area may be configured to not display the image. A boundary region of the top layer may be configured to overlap the peripheral area of the lower panel.

In an exemplary embodiment of the present invention, at a central portion of the display panel, light of the image displayed on the lower panel may be projected onto the top layer along a direction substantially perpendicular to a plane of the lower panel. At a boundary of the peripheral area of the display panel, the light of the image displayed on the lower panel may be projected onto the top layer along an angle that is inclined with respect to the plane of the lower panel.

In an exemplary embodiment of the present invention, the slit layer may include a first layer disposed between the lower panel and the first pattern. A second layer may be disposed between the first pattern and the second pattern. A third layer may be disposed between the second pattern and the top layer.

In an exemplary embodiment of the present invention, the first and second patterns may be metal thin film patterns or printed ink patterns.

In an exemplary embodiment of the present invention, the first layer of the slit layer may have a first thickness. The second layer may have a second thickness. The third layer may have a third thickness. A sum of the second thickness and the third thickness may be larger than the first thickness.

In an exemplary embodiment of the present invention, the first layer of the slit layer may be smaller than the top layer in a plan view.

In an exemplary embodiment of the present invention, the top layer may include a translucent material.

In an exemplary embodiment of the present invention, the lower panel may include a first substrate, a second substrate facing the first substrate, and a liquid crystal layer disposed between the first substrate and the second substrate. The second substrate may include a second base substrate and a color filter disposed on the second base substrate.

In an exemplary embodiment of the present invention, the unit pixel may include a first pixel, a second pixel and a third pixel. A first color filter may be disposed corresponding to the first pixel. A second color filter may be disposed corresponding to the second pixel. A third color filter may be disposed corresponding to the third pixel. The display panel may be configured to display the image on the lower panel corresponding to the first to third pixels. The display panel may be configured to project the image through the first and second slits onto the top layer.

In an exemplary embodiment of the present invention, the slit layer may include a first wall disposed between the lower panel and the first pattern. A second wall may be disposed between the first pattern and the second pattern. A third wall may be disposed between the second pattern and the top layer. Air may be filled in the first and second slits.

In an exemplary embodiment of the present invention, the top layer may include a top base layer facing the slit layer. A black matrix may be disposed on the top base substrate. A color filter may be disposed on the black matrix and the top base substrate.

In an exemplary embodiment of the present invention, a plurality of grooves may be disposed between the lower panel and the slit layer. The plurality of grooves may be configured to form a grating lattice. A plurality of lenses may be disposed between the lower panel and the slit layer.

According to an exemplary embodiment of the present invention, a display apparatus includes a display panel, and a receiving container receiving the display panel. The display panel includes a lower panel configured to display an image and a plurality of unit pixels. A slit layer is disposed on the lower panel. The slit layer includes a first pattern configured to form a first slit corresponding to each of the plurality of unit pixels and a second pattern configured to form a second slit corresponding to the first slit. A top layer is disposed on the slit layer on which the image through the slit layer is projected. The top layer is larger than the lower panel in a plan view. The receiving container includes a bottom portion, and a side wall extending from a boundary of the bottom portion. An outer surface of the side wall, and a side surface of the top layer of the display panel are disposed in a same plane.

In an exemplary embodiment of the present invention, the display apparatus may include an adhesive layer disposed between the receiving container and the display panel. The adhesive layer may be configured to attach the display panel to the receiving container.

In an exemplary embodiment of the present invention, the display apparatus may include a protecting layer disposed on a side surface of the display panel. The protecting layer may be configured to block light and in protect the display panel.

In an exemplary embodiment of the present invention, the protecting layer may include a black colored silicon.

In an exemplary embodiment of the present invention, the display apparatus may include a driving part configured to drive the display panel. The lower panel of the display panel may include a connecting terminal disposed on a peripheral area of the display panel. The peripheral area may be disposed at a boundary of the display panel. The image may be not displayed on the peripheral area. The driving part may be electrically connected to the connecting terminal through a connecting part.

According to an exemplary embodiment of the present invention, a method of manufacturing a display panel includes forming a lower panel for displaying an image. A slit layer for controlling a light path of the image is formed on the lower panel. A top layer on which the image is projected is formed on the slit layer. The top layer is lager than the lower panel in a plan view. Forming the slit layer includes forming a first layer having a first thickness and forming a first pattern having a first slit on the first layer. Forming the slit layer includes forming a second layer having a second thickness on the first layer and forming a second pattern having a second slit on second layer. The second slit is larger than the first slit. Third layer having a third thickness is formed on the second pattern.

In an exemplary embodiment of the present invention, forming the first pattern may include forming a metal layer on the first layer. The first pattern may be formed having the first slit by patterning the metal layer.

According to an exemplary embodiment of the present invention, a display panel includes a lower panel, a top layer larger than the lower panel, and a slit layer disposed between the lower panel and the top layer. An upper surface of the top layer, on which an image is displayed, might not be covered by a receiving container such as a bottom chassis or a middle frame, so that a bezelless display apparatus may be embodied.

In an exemplary embodiment of the present invention, the slit layer may include first to third walls. When light of the image displayed on the lower panel passes through the slit layer and is projected onto the top layer, the light passing the slit layer may pass an empty space (or air layer), so that loss of light efficiency caused by scattering or diffusing may be decreased. Thus, display quality may be increased.

In an exemplary embodiment of the present invention, the top layer may include a color filter and might not include a translucent material, so that loss of light efficiency caused by scattering or diffusing may be decreased. Thus, transmittance may be increased.

In an exemplary embodiment of the present invention, the slit layer includes a first layer smaller than the top layer, so that height of a side wall of a receiving container of a display apparatus having the display panel may be decreased according to a first thickness of the first layer, so that whole thickness of the display apparatus may be decreased.

BRIEF DESCRIPTION OF DRAWINGS

The above and other features of the present invention will become more apparent by describing in detail exemplary embodiments thereof with reference to the accompanying drawings, in which:

FIGS. 9A to 9G are cross-sectional views illustrating a method of manufacturing a display panel according to an exemplary embodiment of the present invention;

FIGS. 10A to 10C are cross-sectional views illustrating a method of manufacturing a display panel according to an exemplary embodiment of the present invention;

FIGS. 11A to 11E are cross-sectional views illustrating a method of manufacturing a display panel according to an exemplary embodiment of the present invention;

DETAILED DESCRIPTION

Hereinafter, exemplary embodiments of the present invention will be explained in more detail with reference to the accompanying drawings.

Figure 1:
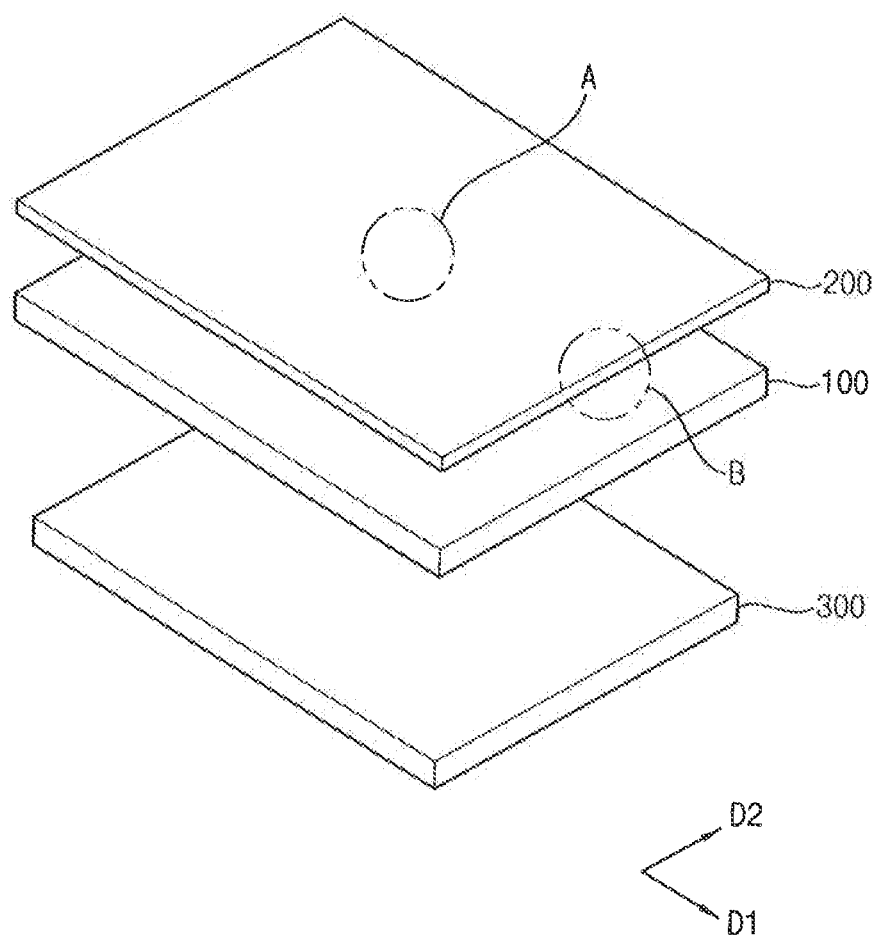
FIG. 1 is an exploded perspective view illustrating a display panel according to an exemplary embodiment of the present invention.

FIG. 1 is an exploded perspective view illustrating a display panel according an exemplary embodiment of the present invention.

Referring to FIG. 1, a display panel includes a slit layer 100, a top layer 200 and a lower panel 300.

The lower panel 300 may display an image. The lower panel 300 may be a liquid crystal display (LCD) panel. The lower panel 300 will be described in more detail below in FIGS. 2 to 5.

The slit layer 100 may be disposed on the lower panel 300, and may be disposed between the lower panel 300 and the top layer 200. The slit layer 100 may change a light path of an image which is displayed on the lower panel 300. Thus, the image on the lower panel 300 may be projected onto the top layer 200 through the slit layer 100.

In a plan view, an area of the lower panel 300 may be smaller than an area of the top layer 200. The slit layer 100 may enlarge the image on the lower panel 300, so that the image is projected onto the top layer 200. In a plan view, the slit layer 100 may have an area substantially the same as the area of the top layer 200. The slit layer 100 will be described in more detail below with reference to FIGS. 2 to 5.

The top layer 200 may be disposed on the slit layer 100. The image displayed on the lower panel 300 may be projected onto the top layer 200. Thus, a user may see the image which is projected onto the top layer 200. The top layer 200 will be described in more detail below with reference to FIGS. 2 to 5.

Figure 2:
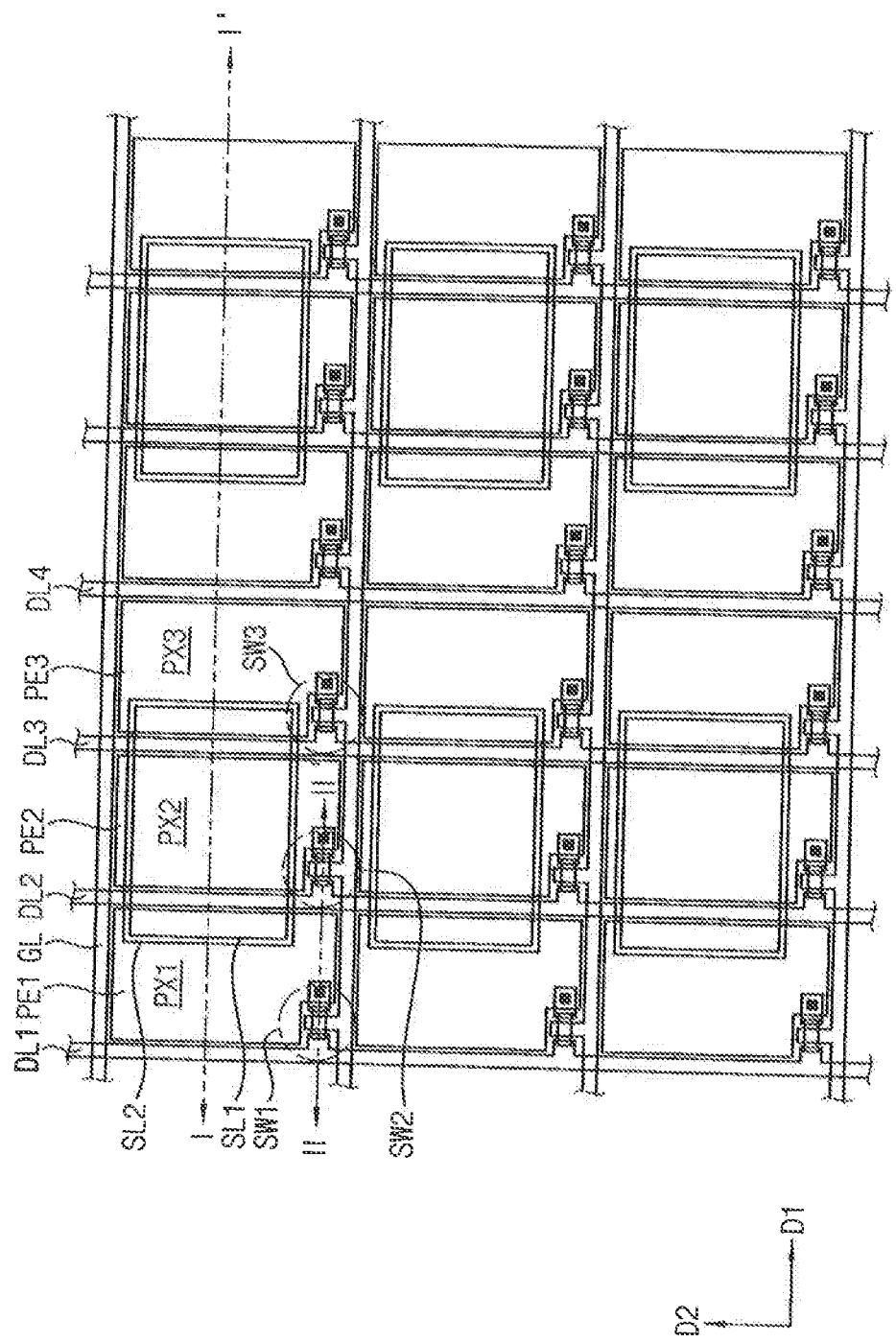
FIG. 2 is a plan view of area A of FIG. 1.

FIG. 2 is a plan view of area A of FIG. 1.

Referring to FIGS. 1 and 2, a lower panel 300 of a display panel may include a plurality of unit pixels which are arranged in a first direction D1 and a second direction D2. The second direction D2 is substantially perpendicular to the first direction D1. For convenience of explanation, only 2×3 unit pixels are illustrated in the figures. Each of the unit pixels may include a first pixel PX1, a second pixel PX2 disposed adjacent to the first pixel PX1 in the first direction D1, and a third pixel PX3 disposed adjacent to the second pixel PX2 in the first direction D1.

The first pixel PX1 may include a first switching element SW1 and a first pixel electrode PE1 electrically connected to the first switching element SW1. The second pixel PX2 may include a second switching element SW2 and a second pixel electrode PE2 electrically connected to the second switching element SW2. The third pixel PX3 may include a third switching element SW3 and a third pixel electrode PE3 electrically connected to the third switching element SW3.

The lower panel 300 of the display panel may include a plurality of gate lines and a plurality of data lines. The gate lines GL may extend in the first direction D1. The gate lines GL may be electrically connected to the first switching element SW1, the switching element SW2 and/or the third switching element SW3. The first data line DL1 may extend in the second direction D2. The first data line DL1 may be electrically connected to the first switching element SW1. The second data line DL2 may be spaced apart from the first data line DL1 in the first direction D1 and may extend in the second direction D2. The second data line DL2 may be electrically connected to the second switching element SW2. The third data line DL3 may be spaced apart from the second data line DL2 in the first direction D1 and may extend in the second direction D2. The third data line DL3 may be electrically connected to the third switching element SW3.

The slit layer 100 of the display panel may include a first slit SL1 and a second slit SL2. The first slit SL1 and the second slit SL2 may correspond with each of the unit pixels. Light of the image displayed on the lower panel 300 may pass through the first slit SL1 and the second slit SL2, and may be projected onto the top layer 200. Thus, the first slit SL1 and the second slit SL2 of the slit layer 100 may control a path of the light projected onto the top layer 200.

The first slit SL1 and the second slit SL2 may have shapes corresponding to the unit pixels having the first to third pixels PX1 to PX3. For example, when each of the first to third pixels PX1 to PX3 has a rectangular shape, the unit pixels including the first to third pixels PX1 to PX3 may have a tetragonal shape (or a square shape), and each of the first and second slits SL1 and SL2 may have a tetragonal shape (or a square shape). The first slit SL1 and the second slit SL2 may have a circular shape or an elliptical shape.

At portion A of the display panel, the light of the image displayed on the lower panel 300 may proceed in a direction perpendicular to the lower panel 300. Thus, the first slit SL1 and the second slit SL2 may overlap each other. The image displayed on the lower panel 300 may pass through the slit layer 100, which includes the first slit SL1 and the second slit SL2, and then the image may be projected onto the top layer 200 which may be larger than the lower panel 300 in a plan view. The second slit SL2 may be larger than the first slit SL1.

At portion B of the display panel, which may be a boundary of the display panel, when the image displayed on the lower panel 300 is projected onto the top layer 200, the light of the image may proceed in an inclined direction with respect to the direction perpendicular to the lower panel 300, so that the first and second silts SL1 and SL2 might not overlap each other. A path of the light at the boundary of the display panel will be described in more detail below with reference to FIG. 17.

Figure 3:
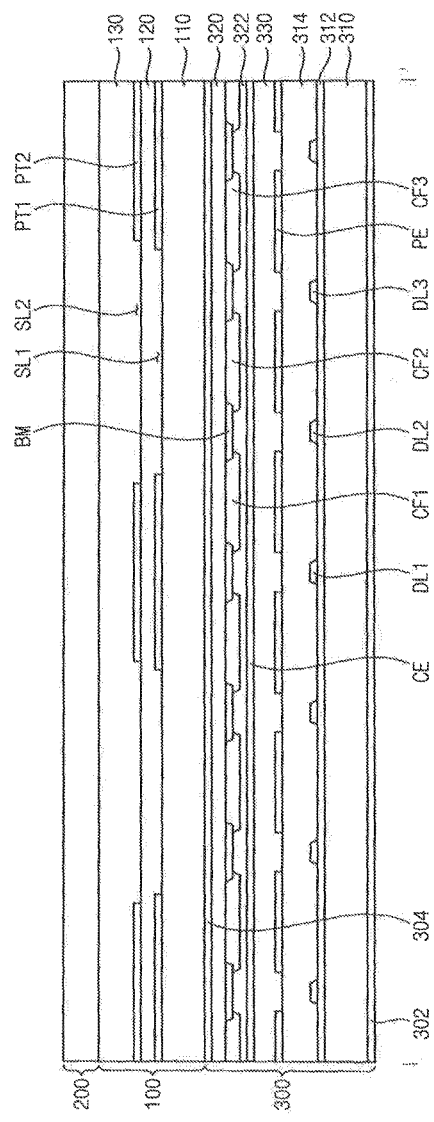
FIG. 3 is a cross-sectional view taken along a line I-I' of FIG. 2.
Figure 4:
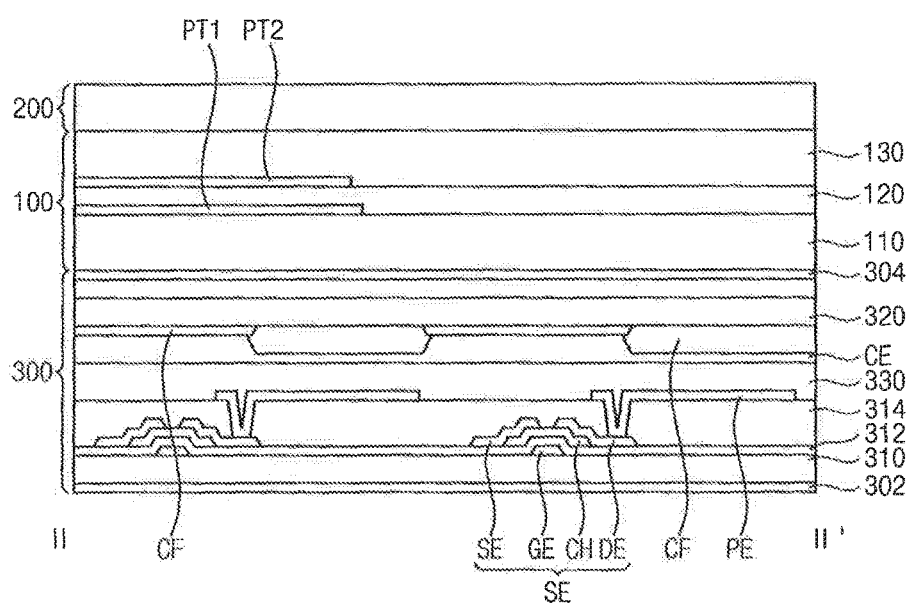
FIG. 4 is a cross-sectional view taken along a line II-II' of FIG. 2.

FIG. 3 is a cross-sectional view taken along a line I-I' of FIG. 2. FIG. 4 is a cross-sectional view taken along a line II-II' of FIG. 2.

Referring to FIGS. 3 and 4, a display panel may include a lower panel 300, a slit layer 100 and a top layer 200.

The lower panel 300 may include a first substrate, a second substrate facing the first substrate, and a liquid crystal layer 330 disposed between the first substrate and the second substrate. The first substrate may include a first base substrate 310, a first insulation layer 312, a switching element SE, a second insulation layer 314 and a pixel electrode PE. The second substrate may include a second base substrate 320, a black matrix BM, first to third color filters CF1, CF2, and CF3, an over coating layer 322 and a common electrode CE.

The first base substrate 310 may be a transparent insulation substrate including, for example, glass and/or plastic. A gate line and a gate electrode GE electrically connected to the gate line may be disposed on the first base substrate 310. The gate electrode GE may include copper (Cu) and/or copper oxide (CuOx). The gate electrode GE may include gallium doped zinc oxide (GZO), indium doped zinc oxide (IZO) and/or manganese-copper alloy (CuMn).

The first insulation layer 312 may be disposed on the first base substrate 310, the gate line and the gate electrode GE. The first insulation layer 312 may be configured to insulate the gate line and the gate electrode GE. The first insulation layer 312 may include silicon oxide (SiOx) and/or silicon nitride (SiNx).

A channel layer CH may be disposed on the first insulation layer 312. The channel layer CH may overlap the gate electrode GE. The channel layer CH may include a semiconductor layer including amorphous silicon (a-Si:H) and an ohmic contact layer including an n+ amorphous silicon (n+ a-Si:H). The channel layer CH may include an oxide semiconductor.

The source electrode SE may be disposed on the channel layer CH, and may be electrically connected to a data line DL crossing the gate line. The source electrode SE may include copper (Cu) and/or copper oxide (CuOx). The drain electrode DE may be disposed on the channel layer CH and may be spaced apart from the source electrode SE. The drain electrode DE may include copper (Cu) and copper oxide (CuOx).

A switching element SE may include the gate electrode GE, the channel layer CH, the source electrode SE and the drain electrode DE.

The second insulation layer 314 may be disposed on the first insulation layer 312 on which the switching element SE is disposed. The second insulation layer 314 may electrically insulate the switching element SE. The second insulation layer 312 may include silicon oxide (SiOx) and/or silicon nitride (SiNx).

The pixel electrode PE may be disposed on the second insulation layer 314. The pixel electrode PE may be disposed on the first insulation layer 312 and may be electrically connected to the drain electrode DE through a contact hole which exposes the drain electrode DE. The pixel electrode PE may include a transparent conductive material, such as indium tin oxide (ITO) or indium zinc oxide (IZO). The first electrode ELI may include titanium (Ti) and/or molybdenum titanium (MoTi).

The second base substrate 320 may face the first base substrate 310. The second base substrate 320 may be a transparent insulation substrate including, for example, glass and/or plastic.

The black matrix BM may be disposed on the second base substrate 320. The black matrix BM may block light and may be disposed corresponding to the non-display area. Thus, the black matrix BM may overlap the data line DL, the gate line GL and the switching element SE.

The first to third color filters CF1 to CF3 may be disposed on the second base substrate 320 on which the black matrix BM may be disposed.

The over-coating layer 322 may be disposed on the black matrix BM and the color filters. The over-coating layer 322 may flatten, protect and insulate the color filters (e.g., CF1 to CF3). The over-coating layer 322 may include an acrylic-epoxy material.

The common electrode CE may be disposed on the over-coating layer 322. The common electrode CE may include a transparent conductive material. For example, the common electrode CE may include indium tin oxide (ITO) or indium zinc oxide (IZO). The common electrode CE may include titanium (Ti) and/or molybdenum titanium (MoTi).

The liquid crystal layer 330 may be disposed between the first substrate and the second substrate. The liquid crystal layer 330 may include liquid crystal molecules having optical anisotropy. The liquid crystal molecules may be driven by an electric field, so that an image is displayed by passing or blocking light through the liquid crystal layer 330.

The lower panel 300 may include a lower polarizing plate 302 and an upper polarizing plate 304. The lower polarizing plate 302 may be disposed on the first base substrate 310 opposite to the first insulation layer 312. The upper polarizing plate 304 may be disposed on the second base substrate 320 opposite to the black matrix BM. A transmission axis of the upper polarizing plate 302 may be perpendicular to a transmission axis of the lower polarizing plate 302.

A plurality of grooves may be disposed on the upper polarizing plate 304 to form a grating lattice (not shown). The grating lattice may control the path of the light when the image displayed on the lower panel 300 is projected onto the top layer 200. Thus, when the slit layer 100 controls the path of the light, the grating lattice may compensate for a defect in the path of the light. A plurality of micro lenses may be disposed on the upper polarizing plate 304.

The slit layer 100 may be disposed on the lower panel 300, and may include a first layer 110, a first pattern PT1, a second layer 120, a second pattern PT2 and a third layer 130.

The first layer 110 may be disposed on the upper polarizing plate 304 of the lower panel 300. The first layer 110 has a first thickness. The first layer 110 may include a material which has a coefficient of expansion substantially the same as that of the second base substrate 320. For example, the first layer 110 may include a glass, a plastic, a polymethyl methacrylate (PMMA), a methacrylate styrene or a polystyrene (PS).

The first pattern PT1 may be disposed on the first layer 110. The first pattern PT1 may form the first slit SL1. Light may be blocked by the first pattern PT1 and pass through the first slit SL1. The first pattern PT1 may be a thin film pattern configured to form the first slit SL1. For example, the first pattern PT1 may be a metal thin film pattern. The first pattern PT1 may be formed by printing ink, which blocks light, on the first layer 100.

The second layer 120 may be disposed on the first layer 110 on which the first pattern PT1 is formed. The second layer 120 has a second thickness. The second layer 120 may include a material which has a coefficient of expansion substantially the same as that of the first layer 110. For example, the second layer 120 may include a glass, a plastic, a polymethyl methacrylate (PMMA), a methacrylate styrene or a polystyrene (PS).

The second pattern PT2 may be disposed on the second layer 120. The second pattern PT2 may form the second slit SL2. Light may be blocked by the second pattern P12 and pass through the second slit SL2. The second pattern PT2 may be a thin film pattern configured to form the second slit SL2. For example, the second pattern PT2 may be a metal thin film pattern. The second pattern PT2 may be formed by printing ink, which blocks light, on the first layer 110.

The third layer 130 may be disposed on the second layer 120 on which the second pattern PT2 is formed. The third layer 130 has a third thickness. The third layer 130 may include a material which has a coefficient of expansion substantially the same as that of the first and second layers 110 and 120. For example, the third layer 130 may include a glass, a plastic, a polymethyl methacrylate (PMMA), a methacrylate styrene, or a polystyrene (PS).

The path of the light of the image displayed on the lower panel 300 may be controlled by adjusting sizes of the first and second slits SL1 and SL2, and thickness of the first to third layers 110 to 130. Thus, according to sizes of the lower panel 300 and the top layer 200, a size of the image projected onto the top layer 200 may be controlled by adjusting the sizes of the first and second slits SL1 and SL2, and the thicknesses of the first to third layers 110 to 130. For example, a size of the second slit SL2 may be larger than a size of the first slit SL1, and a sum of the second thickness of the second layer 120 and the third thickness of the third layer 130 may be larger than the first thickness of the first layer 110.

The top layer 200 may be disposed on the third layer 130 of the slit layer 100. The top layer 200 may include a material that causes light scattering. For example, the top layer 200 may include a translucent glass. The top layer 200 may include a glass layer including a particle having a transmittance different from that of the glass layer. Thus, the image disposed on the lower panel 300 may proceed through the slit layer 100, and then the image may be projected onto the top layer 200.

Figure 5:
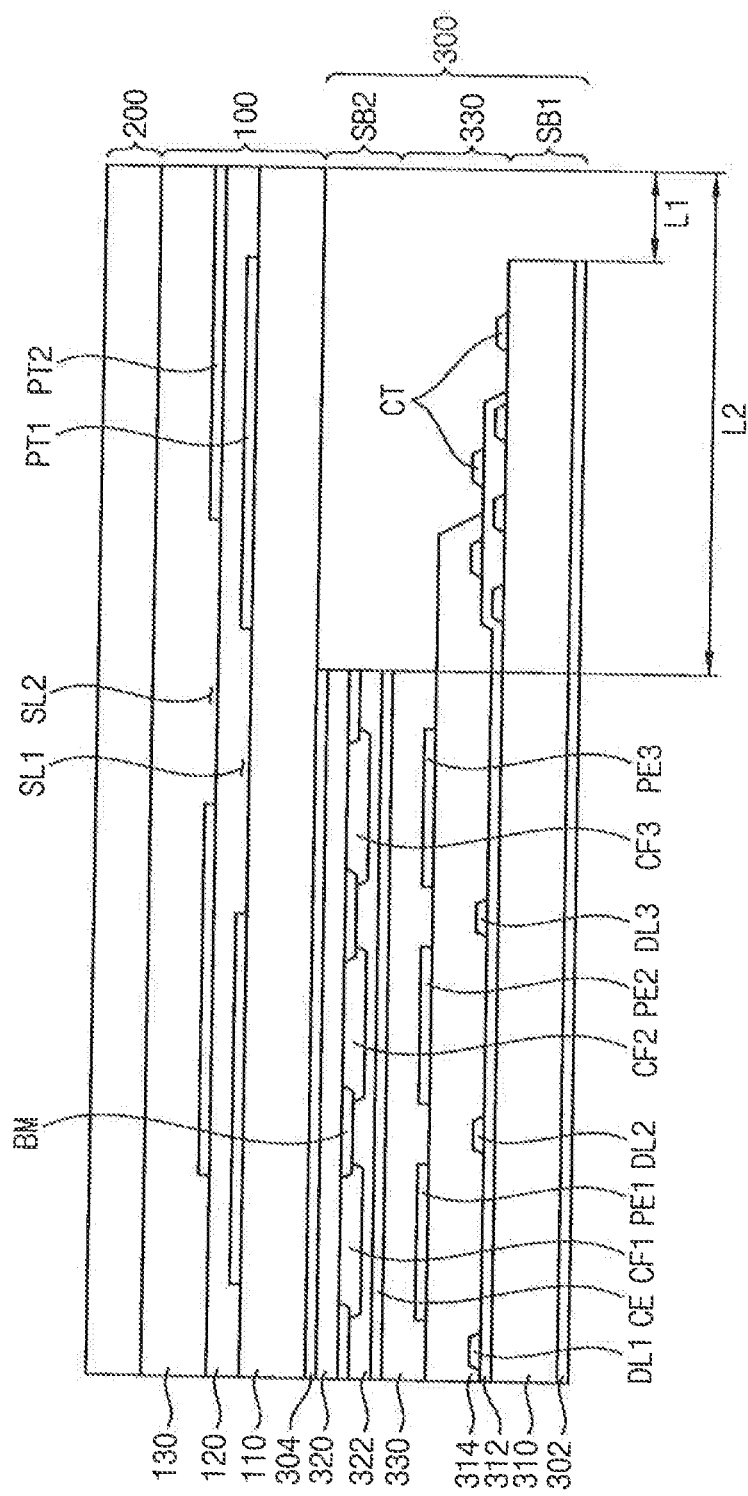
FIG. 5 is a plan view of area B of FIG. 1.

FIG. 5 is a plan view of area B of FIG. 1.

Referring to FIG. 5, a display panel includes a lower panel 300, a slit layer 100 and a top layer 200.

The lower panel 300 may include a first substrate SB1, a second substrate SB2 facing the first substrate SB1 and a liquid crystal layer 330 disposed between the first and second substrates SB1 and SB2. The first substrate SB1 may include a first base substrate 310, a first insulation layer 312, a switching element SE, a second insulation layer 314 and first to third pixel electrodes PE1 to PE3. The second substrate SB2 may include a second base substrate 320, a black matrix BM, first to third color filters CF1 to CF3, air over-coating layer 322 and a common electrode CE.

A boundary of the first substrate SB1 may be spaced apart from a boundary of the display panel (e.g., boundary of the slit layer 100 or a boundary of the top layer 200) by a first length L1. The first substrate SB1 may be shorter than the display panel in a cross-sectional view. A boundary of the second substrate SB2 may be spaced apart from the boundary of the display panel by a second length L2. The second substrate SB2 may be shorter than the display panel in a cross-sectional view. The second length L2 may be larger than the first length L1. Thus, a peripheral portion of the first substrate SB1 may be exposed to an outside of the display panel. A connecting terminal CT may be disposed on the peripheral portion of the first substrate SB1, which may be exposed. The connecting terminal CT may receive a signal to drive the lower panel 300. For example, the display panel may be electrically connected to a driving part (e.g., driving part 50 of FIG. 12) through the connecting terminal CT. The driving part may drive the display panel.

A unit pixel may be disposed adjacent to the boundary of the display panel and may include a first pixel, a second pixel and a third pixel. The first color filter CF1 may be disposed corresponding to the first pixel. The second color filter CF2 may be disposed corresponding to the second pixel. The third color filter CF3 may be disposed corresponding to the third pixel. Light of an image displayed on the lower panel 300 may pass through a first slit SL1 and a second slit SL2 of the slit layer 100, and then the image may be projected onto a boundary portion of the top layer 200. Thus, a size of the image projected onto the top layer 200 may be larger than a size of the image displayed on the lower panel 300. The image may be displayed on the peripheral portion of the display panel where the connecting terminal CT of the first substrate SB1 of the display panel is disposed.

Figure 6:
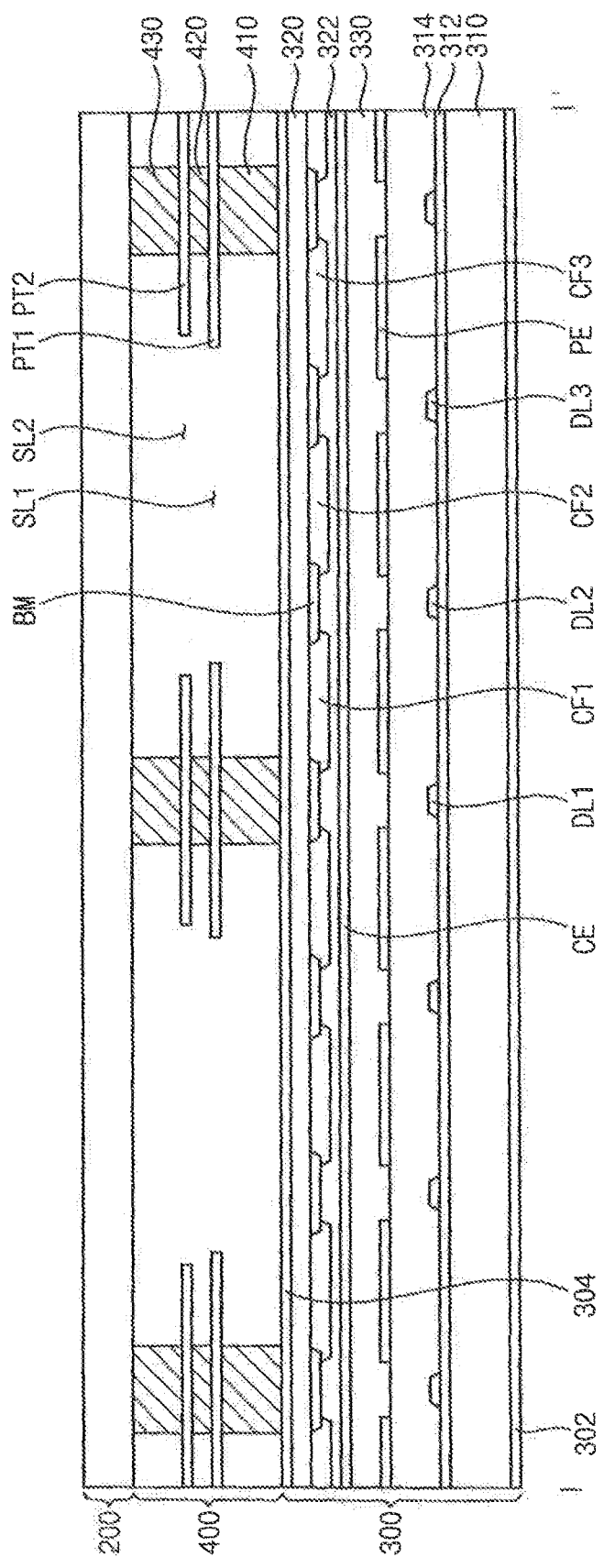
FIG. 6 is a cross-sectional view illustrating a display panel according to an exemplary embodiment of the present invention.

FIG. 6 is a cross-sectional view illustrating a display panel according to an exemplary embodiment of the present invention.

Referring to FIG. 6, the display panel is substantially the same as the display panel of FIG. 3 except for a slit layer 400. Thus, descriptions of the same elements described with reference to FIG. 3 may be omitted.

The display panel may include a lower panel 300, a slit layer 100 and a top layer 200.

The lower panel 300 may include a first substrate, a second substrate facing the first substrate, and a liquid crystal layer 330 disposed between the first substrate and the second substrate. The first substrate may include a first base substrate 310, a first insulation layer 312, a switching element SE, a second insulation layer 314 and a pixel electrode PE. The second substrate may include a second base substrate 320, a black matrix BM, first to third color filters CF1 to CF3, an over-coating layer 322 and a common electrode CE.

A unit pixel of the display panel may include a first pixel, a second pixel and a third pixel. The first color filter CF1 may be disposed corresponding to the first pixel. The second color filter CF2 may be disposed corresponding to the second pixel. The third color filter CF3 may be disposed corresponding to the third pixel.

The slit layer 400 may include a first wall 410, a first pattern PT1, a second wall 420, a second pattern PT2 and a third wall 430.

The first wall 410 may be disposed corresponding to a boundary of the unit pixel. The first wall 410 may separate the first pattern PT1 from the lower panel 300. For example, the first wall 410 may be a glass substrate having a plurality of openings.

The first pattern PT1 may be disposed on the first wall 410. The first pattern PT1 may form a first slit SL1. Light may be blocked by the first pattern PT1 and pass through the first slit SL1. The first pattern PT1 may be a thin film pattern configured to form the first slit SL1. For example, the first pattern PT1 may be a metal thin film pattern or a thin film including a material which blocks light.

The second wall 420 may be disposed on the first pattern PT1. The second wall 420 may separate the second pattern PT2 from the first pattern PT1. For example, the second wall 420 may be a glass substrate having a plurality of openings.

The second pattern PT2 may be disposed on the second wall 420. The second pattern PT2 may form a second slit SL2. Light may be blocked by the second pattern PT2 and pass through the second slit SL2. The second pattern P1'2 may be a thin film pattern configured to form the second slit SL2. For example, the second pattern P12 may be a metal thin film pattern or a thin film including a material which blocks light.

When the light of the image displayed on the lower panel 300 passes through the slit layer 100 and is projected onto the top layer 200, the light passing through the slit layer 100 may pass through an empty space (e.g., an air layer), and a loss of light efficiency caused by scattering or diffusing may be decreased. Thus, display quality may be increased.

Figure 7:
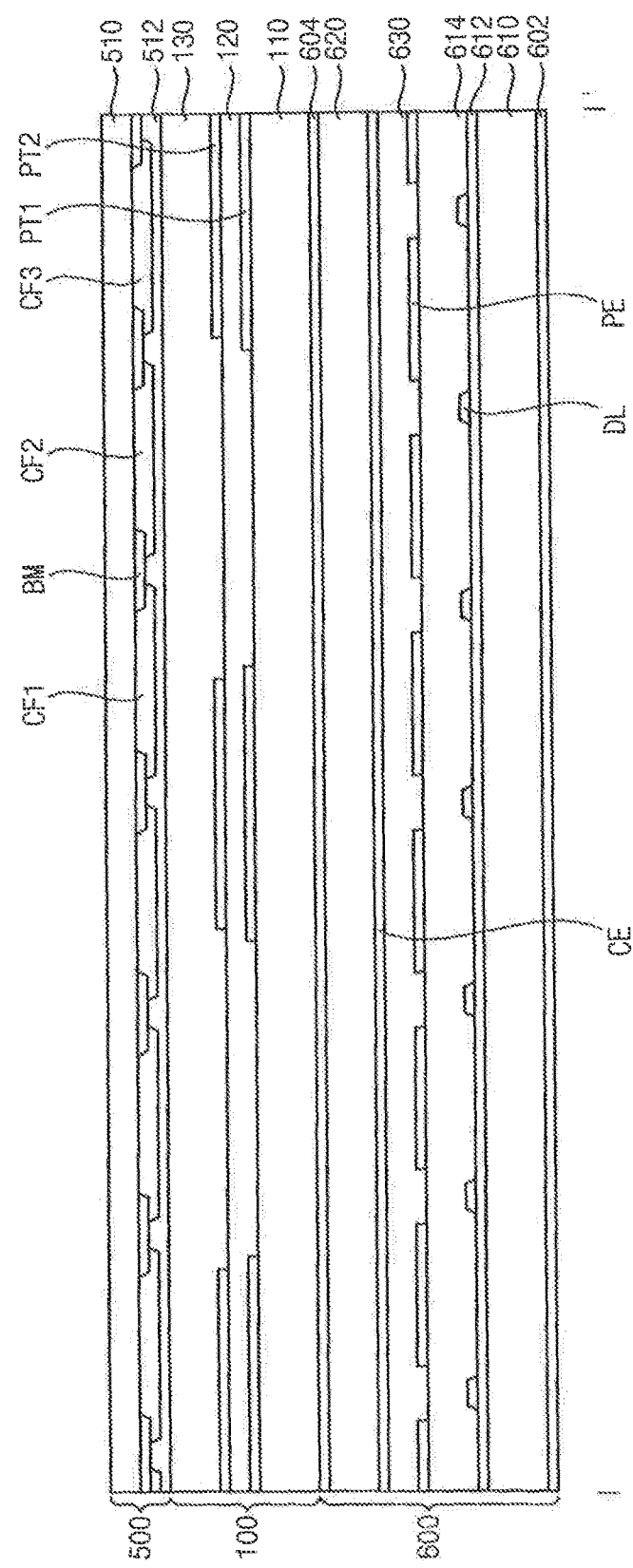
FIG. 7 is a cross-sectional view illustrating a display panel according to an exemplary embodiment of the present invention.

FIG. 7 is a cross-sectional view illustrating a display panel according to an exemplary embodiment of the present invention.

Referring FIG. 7, the display panel may be substantially the same as the display panel of FIG. 3 except for a color filter of a lower panel 600 disposed on a top layer 500. Thus, descriptions of the same elements described with reference to FIG. 3 may be omitted.

The display panel may include a lower panel 600, a slit layer 100 and a top layer 500.

The lower panel 600 may include a first substrate, a second substrate facing the first substrate, and a liquid crystal layer 630 disposed between the first substrate and the second substrate. The first substrate may include a first base substrate 610, a first insulation layer 612, a switching element SE, a second insulation layer 614 and a pixel electrode PE. The second substrate may include a second base substrate 620 and a common electrode CE.

The first insulation layer 612 may be disposed on the first base substrate 610 on which a gate pattern including a gate line is disposed. A data pattern including a data line DL may be disposed on the first insulation layer 612. The second insulation layer 614 may be disposed on the data pattern including the data line DL. The pixel electrode PE may be disposed on the second insulation layer 614.

The second base substrate 620 may face the first base substrate 610. The common electrode CE may be disposed on the second base substrate 620.

The liquid crystal layer 630 may be disposed between the first substrate and the second substrate.

The lower panel 600 may include a lower polarizing plate 602 and an upper polarizing plate 604. The lower polarizing plate 602 may be disposed on the first base substrate 610 opposite the first insulation layer 612. The upper polarizing plate 604 may be disposed on the second base substrate 620 opposite the common electrode CE.

The slit layer 100 may be disposed on the lower panel 300, and may include a first layer 110, a first pattern PT1, a second layer 120, a second pattern PT2 and a third layer 130.

The top layer 500 may be disposed on the third layer 130 of the slit layer 100. The top layer 500 may include a top base substrate 510, a black matrix BM, first to third color filters CF1 to CF3 and an over-coating layer 512.

The top base substrate 510 may face the slit layer 100. The top base substrate 510 may be a transparent insulation substrate including, for example, glass and/or plastic.

The black matrix BM may be disposed on the top base substrate 510. The black matrix BM may block light and may be disposed corresponding to a non-display area. Thus, the black matrix BM may overlap the data line DL, the gate line GL and the switching element SE.

The first to third color filters CF1 to CF3 may be disposed on the top base substrate 510 on which the black matrix BM is disposed. The first to third color filters CF1 to CF3 may be disposed corresponding to first to third pixels. The first to third pixels may compose a unit pixel. The display panel may include a plurality of the unit pixels.

An image displayed on the lower panel 600 may be a monochrome image formed by white light. Light of the image passing the slit layer 100 and the first to third color filters CF1 to CF3 of the top layer 500 may have multiple colors. Thus, the lower panel might not include color filters. Colored images may be filtered by the first to third color filters CF1 to CF3 of the top layer 500. In this case, the top layer 500 might not include a translucent material, and a loss of light efficiency caused by scattering or diffusing may be decreased. Thus, display quality may be increased.

The over-coating layer 512 may be disposed on the black matrix BM and the color filters (e.g., the first to third color filters CF1 to CF3). The over-coating layer 512 may flatten, protect and insulate the color filters. The over-coating layer 512 may include an acrylic-epoxy material.

Figure 8:
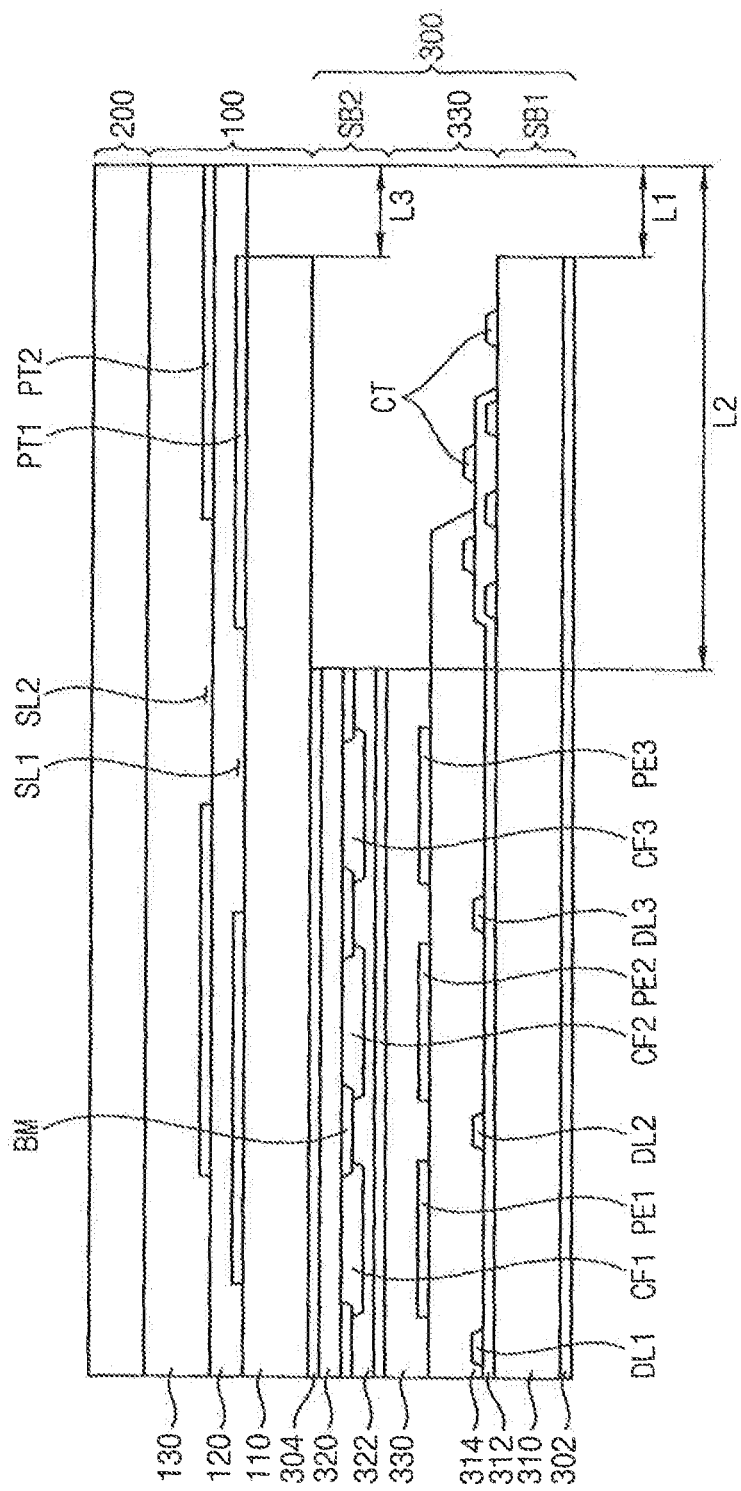
FIG. 8 is a cross-sectional view illustrating a display panel according to an exemplary embodiment of the present invention.

FIG. 8 is a cross-sectional view illustrating a display panel according to an exemplary embodiment of the present invention.

Referring to FIG. 8, the display panel may be substantially the same as the display panel of FIG. 5 except for a first layer 110 of the slit layer 100. Thus, descriptions of the same elements described with reference to FIG. 5 may be omitted.

The display panel may include a lower panel 300, a slit layer 100 and a top layer 200.

The lower panel 300 may include a first substrate, a second substrate facing the first substrate, and a liquid crystal layer 330 disposed between the first substrate and the second substrate. The first substrate may include a first base substrate 310, a first insulation layer 312, a switching element SE, a second insulation layer 314 and a pixel electrode PE. The second substrate rimy include a second base substrate 320, a black matrix BM, first to third color filters CF1 to CF3, an over-coating layer 322 and a common electrode CE.

A boundary of the first substrate SB1 may be spaced apart from a boundary of the display panel a boundary of the slit layer 100 or a boundary of the top layer 200) by a first length L1. The first substrate SB1 may be shorter than the display panel in a cross-sectional view. A boundary of the second substrate SB2 may be spaced apart from the boundary of the display panel by a second length L2. The second substrate SB2 may be shorter than the display panel in a cross-sectional view. The second length L2 may be larger than the first length L1. Thus, a peripheral portion of the first substrate SB1 may be exposed to an outside of the display panel. A connecting terminal CT may be firmed on the peripheral portion of the first substrate SB1, which may be exposed. The connecting terminal CT may receive a signal to drive the lower panel 300. For example, the display panel may be electrically connected to a driving part (e.g., driving part 50 of FIG. 12) through the connecting terminal CT. The driving part may drive the display panel.

The slit layer 100 may include a first layer 110, first pattern PT1, a second layer 120, a second pattern PT2 and a third layer 130.

A boundary of the first layer 110 may be spaced apart from a boundary of the top layer 200 by a third length L3. The first layer 110 may be shorter than the display panel in a cross-sectional view. Thus, a height of a side wall of a receiving container of a display apparatus having the display panel may be decreased according to a first thickness of the first layer 110, and a whole thickness of the display apparatus may be decreased.

A unit pixel may be disposed adjacent to the boundary of the display panel and may include a first pixel, a second pixel and a third pixel. The first color filter CF1 may be disposed corresponding to the first pixel. The second color filter CF2 may be disposed corresponding to the second pixel. The third color filter CF3 may be disposed corresponding to the third pixel. Light of an image displayed on the lower panel 300 may pass a first slit SL1 and a second slit SL2 of the slit layer 100, and then the image may be projected onto a boundary portion of the top layer 200. Thus, a size of the image projected onto the top layer 200 may be larger than a size of the image displayed on the lower panel 300, and the image may be displayed on the peripheral portion of the display panel where the connecting terminal CT of the first substrate SB1 of the display panel is disposed.

FIGS. 9A to 9G are cross-sectional views illustrating a method of manufacturing a display panel according to an exemplary embodiment of the present invention.

Figure 9A:

Referring to FIG. 9A, a metal layer PT1a may be formed on a first layer 110. The first layer 110 has a first thickness. The first layer 110 may include a glass, a plastic, a polymethyl methacrylate (PMMA), a methacrylate styrene, or a polystyrene (PS). The metal layer PT1a may block light.

Figure 9B:
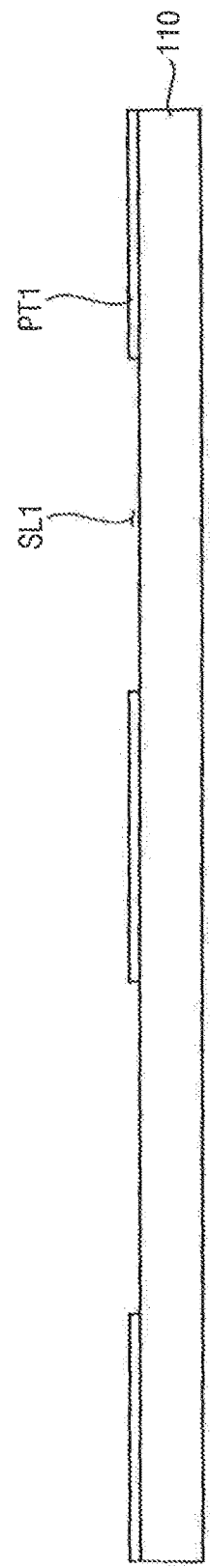

Referring to FIG. 9B, a first pattern PT1 may be formed by pattering the metal layer PT1a. For example, a photoresist composition may be coated on the metal layer PT1a, and then a photoresist pattern corresponding to the first pattern PT1 may be formed. The first pattern PT1 may be formed by etching the metal layer PT1a which is not covered by the photoresist pattern. The first pattern PT1 may form a first slit SL1. Light may be blocked by the first pattern PT1 and pass through the first slit SL1.

Referring to FIG. 9C, a second layer 120 may be formed on the first layer 110 on which the first pattern PT1 is formed. The second layer 120 has a second thickness. The second layer 120 may include a material which has a coefficient of expansion substantially the same as that of the first layer 110. For example, the second layer 120 may include a glass, a plastic, a polymethyl methacrylate (PMMA), a methacrylate styrene, or a polystyrene (PS).

Figure 9D:
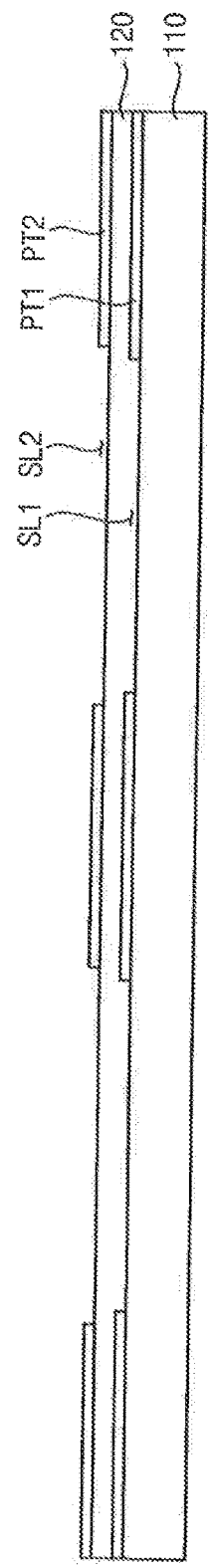
Figure 9E:
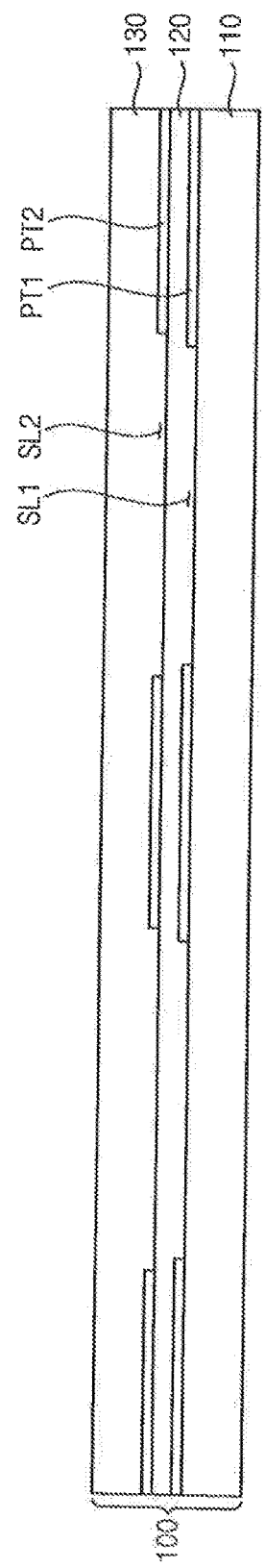

Referring to FIG. 9D, a second pattern PT2 may be formed on the second layer 120. The second pattern PT2 may form a second slit SL2. Light may be blocked by the second pattern PT2 and pass through the second slit SL2. The second pattern PT2 may be formed by patterning a metal layer on the second layer 120. For example, the metal layer may be formed on the second layer 120, a photoresist composition may be coated on the metal layer, and then a photoresist pattern corresponding to the second pattern PT2 may be formed. The second pattern PT2 may be formed by etching the metal layer which is not covered by the photoresist pattern.

The first and second patterns PT1 and PT2 may be formed by ink printing.

Referring to 9E, a third layer 130 may be formed on the second layer 120 on which the second pattern PT2 is formed. The third layer 130 has a third thickness. The third layer 130 may include a material which has a coefficient of expansion substantially the same as that of the first and second layers 110 and 120. For example, the third layer 130 may include a glass, a plastic, a polymethyl methacrylate (PMMA), a methacrylate styrene, or a polystyrene (PS).

A slit layer 100 including the first layer 110, the first pattern PT1, the second layer 120, the second pattern PT2 and the third layer 130 may be formed.

Figure 9F:
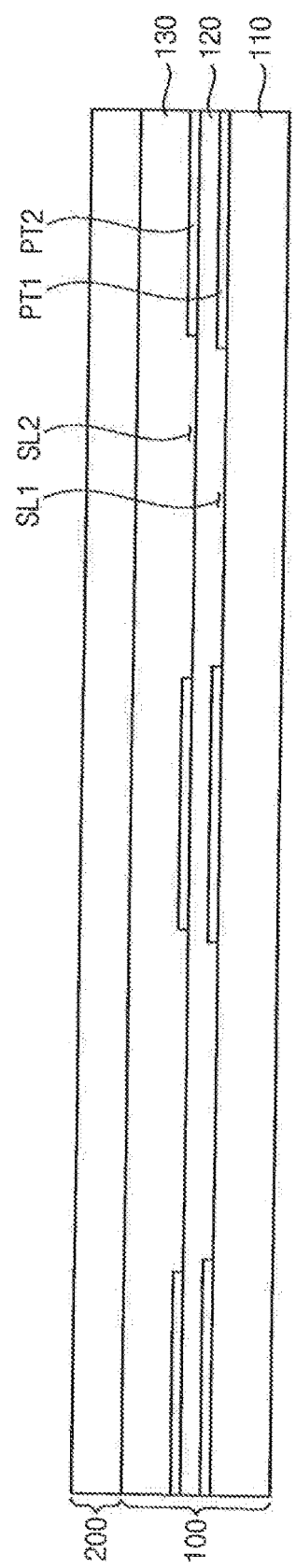

Referring to FIG. 9F, a top layer 200 may be formed on the third layer 130. The top layer 200 may include a material causing light scattering. For example, the top layer 200 may include a translucent glass. The top layer may be a glass layer including a particle having a transmittance different from that of glass.

Figure 9G:
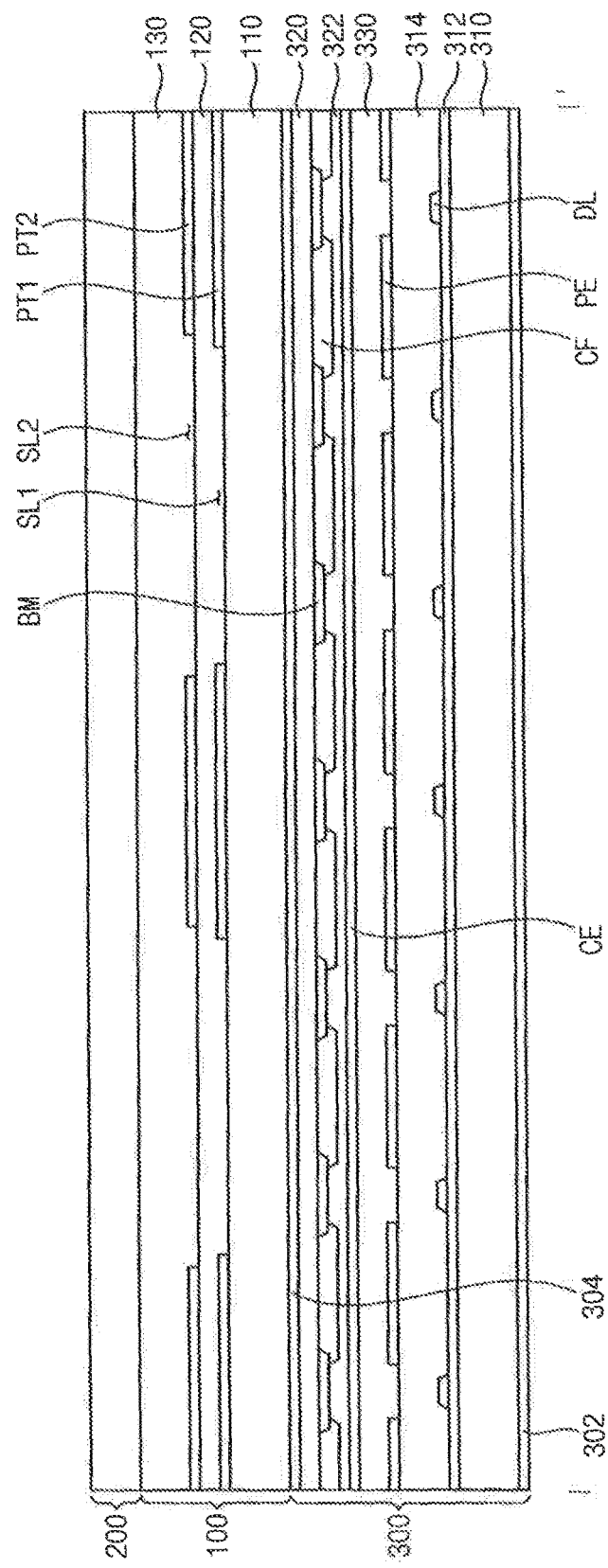

Referring to FIG. 9G, a lower panel 300 may be formed on the slit layer 100 opposite to the top layer 200. The lower panel 300 may be separately formed, and then attached on the slit layer 100.

The lower panel 300 may include a lower polarizing plate 302, a first base substrate 310, a first insulation layer 312, a data line DL, a second insulation layer 314, a pixel electrode PE, an upper polarizing plate 304, a second base substrate 320, a black matrix BM, a color filter CF, an over-coating layer 322, a common electrode CE and a liquid crystal layer 330. The lower panel 300 may be substantially the same as the lower panel of FIGS. 1 to 5. The lower panel 300 may be a liquid crystal display panel.

A plurality of grooves may be formed on the upper polarizing plate 304, so that a grating lattice (not shown) may be formed. A plurality of micro lenses may be formed on the upper polarizing plate 304.

Figure 10B:
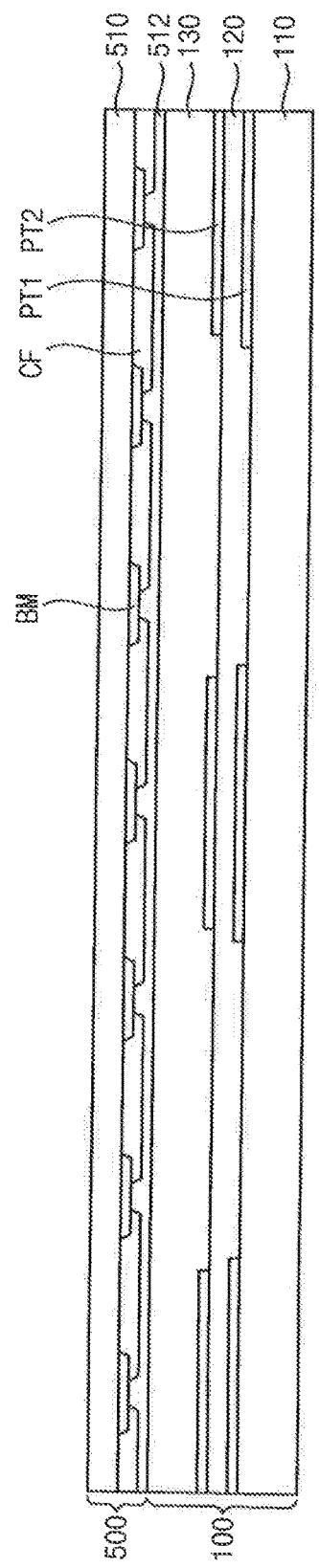
Figure 10C:
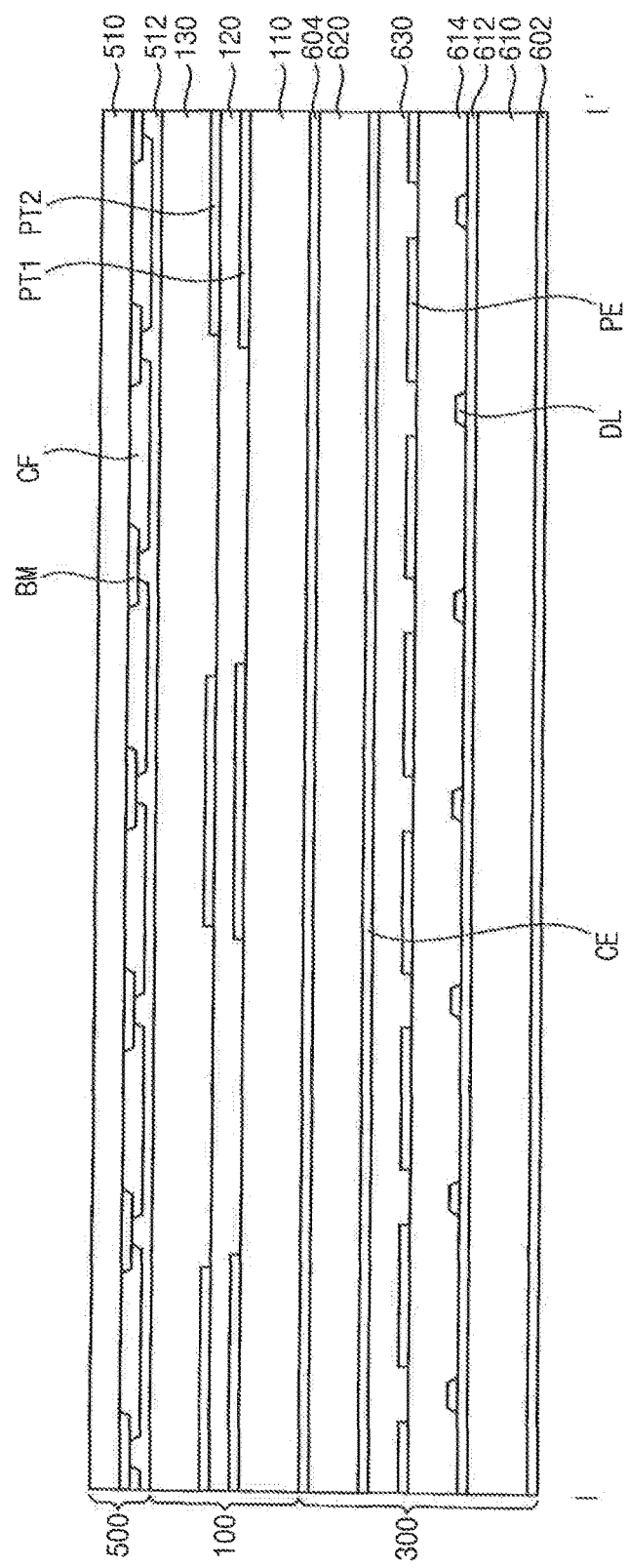

FIGS. 10A to 10C are cross-sectional views illustrating a method of manufacturing a display panel according to an exemplary embodiment of the present invention.

Referring to FIG. 10A, a slit layer 100 may include the first layer 110, the first pattern PT1, the second layer 120, the second pattern PT2, and the third layer 130. The first pattern PT1 may form the first slit SL1. The second pattern PT2 may form the second slit SL2.

Referring FIG. 10B, a top layer 500 may be formed on the slit layer 100. The top layer may include a top base substrate 510, a black matrix BM, a color filter CF and an over-coating layer 512.

The black matrix BM may be formed on the top base substrate 510. The color filter CF may be formed on the top base substrate 510 on which the black matrix BM is formed. The over-coating layer 512 may be formed on the black matrix BM and the color filter CF. After forming the top layer 500 including the top base substrate 510, the black matrix BM, the color filter CF and the over-coating layer 512, the top layer 500 may be attached to the slit layer 100. The top layer 500 may be attached to the slit layer 100 by an adhesive.

Referring to FIG. 10C, a lower panel 300 may be formed on the slit layer 100 opposite to the top layer 500. The lower panel 300 may be separately formed, and then attached on the slit layer 100.

The lower panel 300 may include a lower polarizing plate 302, a first base substrate 310, a first insulation layer 312, a data line DL, a second insulation layer 314, a pixel electrode PE, an upper polarizing plate 304, a second base substrate 320, a black matrix BM, a color filter CF, an over-coating layer 322, a common electrode CE and a liquid crystal layer 330. The lower panel 300 may be substantially the same as the lower panel 300 described with respect to FIGS. 1 to 5. The lower panel 300 may be a liquid crystal display panel.

FIGS. 11A to 11E are cross-sectional views illustrating a method of manufacturing a display panel according to an exemplary embodiment of the present invention.

Figure 11A:
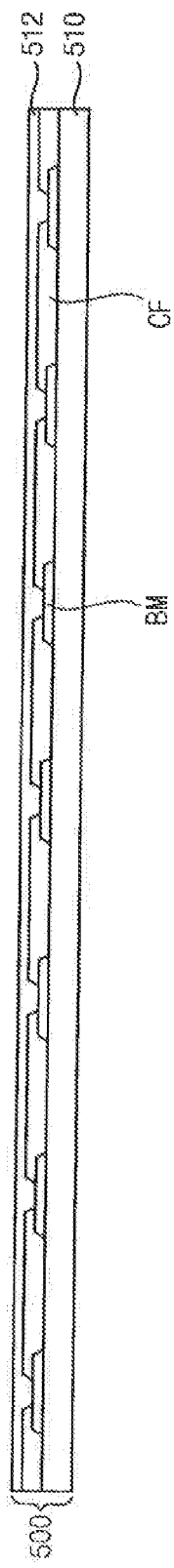

Referring to FIG. 11A, a top layer 500 including a top base substrate 510, a black matrix BM, color filter CF and an over-coating layer 512 may be formed.

For example, the black matrix BM may be formed on the top base substrate 510. The color filter CF may be formed on the top base substrate 510 on which the black matrix BM is formed. The over-coating layer 512 may be formed on the black matrix BM and the color filter CF.

Referring to FIG. 1113, a third layer 130 may be formed on the over-coating layer 512. The third layer 130 has a third thickness. The third layer 130 may include a glass, a plastic, a polymethyl methacrylate (PMMA), a methacrylate styrene, or a polystyrene (PS).

Figure 11C:
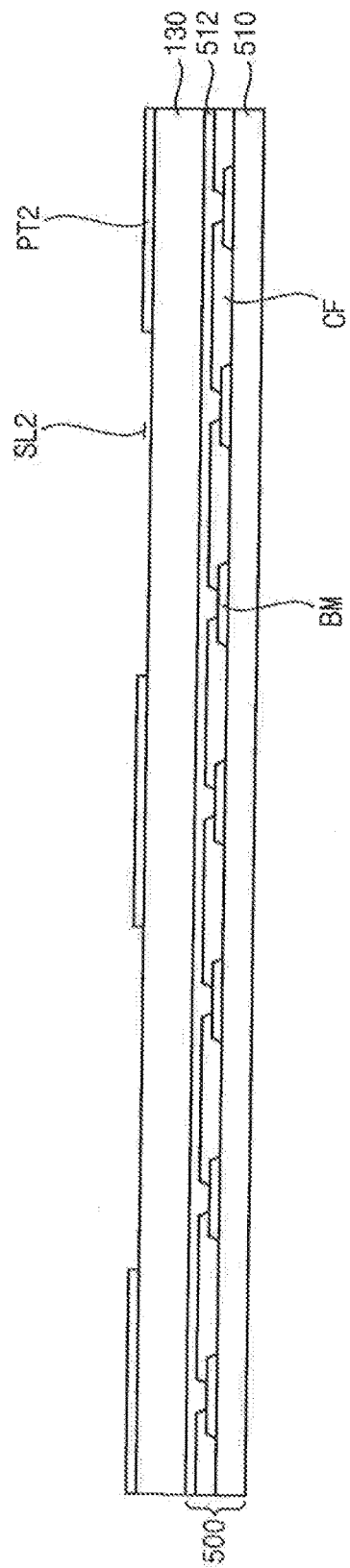

Referring to FIG. 11C, the second pattern PT2 may be formed on the third layer 130. The second pattern PT2 may form a second slit SL2. Light may be blocked by the second pattern PT2 and may pass through the second slit SL2. The second pattern PT2 may be formed by patterning a metal layer on the second layer 120. For example, the metal layer may be formed on the second layer 120, a photoresist composition may be coated on the metal layer, and then a photoresist pattern corresponding to the second pattern P12 may be formed. The second pattern PT2 may be formed by etching the metal layer which is not covered by the photoresist pattern.

Figure 11D:
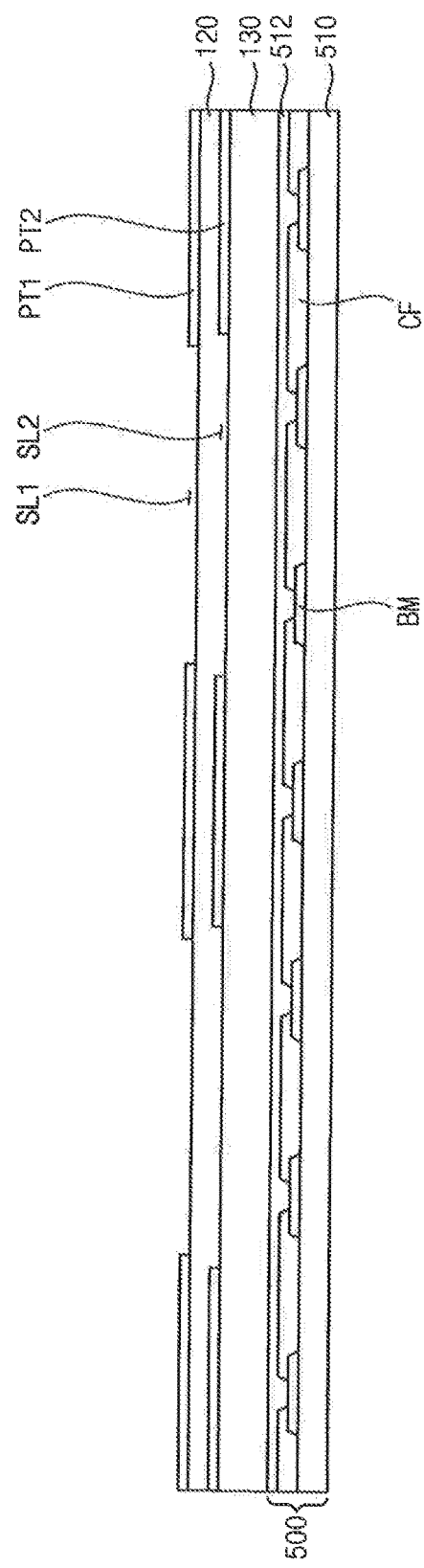

Referring to FIG. 11D, a second layer 120 may be formed on the third layer 130 on which the second pattern P12 is formed. The second layer 120 has a second thickness. The second layer 120 may include a material which has a coefficient of expansion substantially the same as that of the third layer 130. For example, the second layer 120 may include a glass, a plastic, a polymethyl methacrylate (PMMA), a methacrylate styrene, or a polystyrene (PS).

A first pattern PT1 may be formed on the second layer 120. The first pattern PT1 may form a first slit SL1. Light may be blocked by the first pattern PT1 and may pass through the first slit SL1. The first pattern PT1 may be formed by patterning a metal layer on the second layer 120. For example, the metal layer may be formed on the second layer 120, a photoresist composition may be coated on the metal layer, and then a photoresist pattern corresponding to the first pattern PT1 may be formed. The first pattern PT1 may be formed by etching the metal layer which is not covered by the photoresist pattern.

Figure 11E:
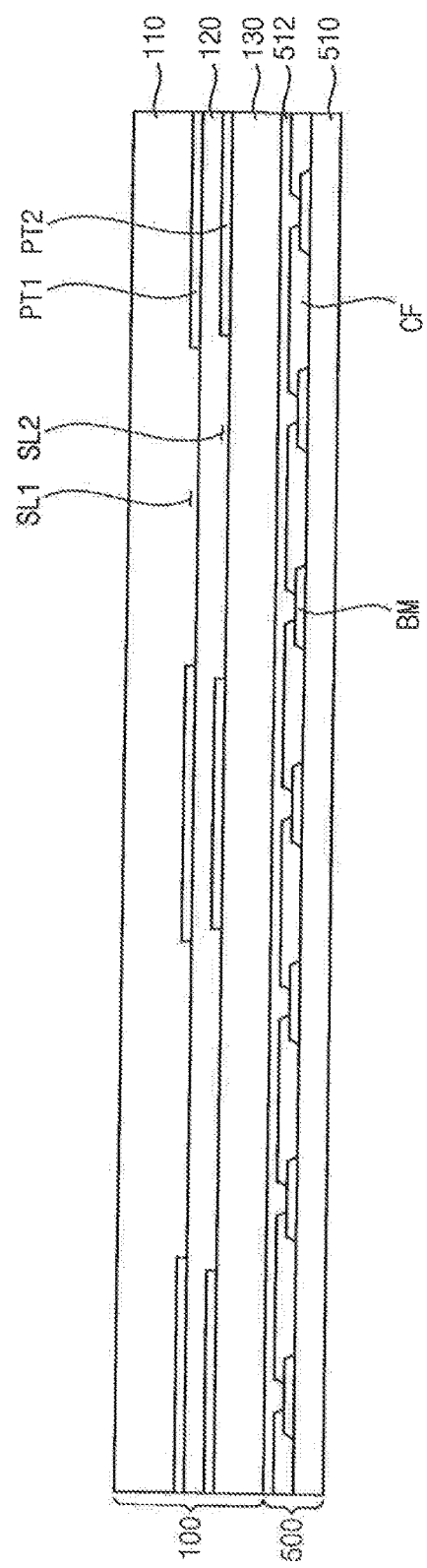

Referring to FIG. 11E, a first layer 110 may be formed on the second layer 120 on which the first pattern PT1 is formed. The first layer 110 has a first thickness. The first layer 120 may include a material which has a coefficient of expansion substantially the same as that of the second and third layers 120 and 130. For example, the first layer 110 may include a glass, a plastic, a polymethyl methacrylate (PMMA), a methacrylate styrene, or a polystyrene (PS).

A lower panel (e.g., lower panel 600) may be formed on the first layer 110.

Figure 12:
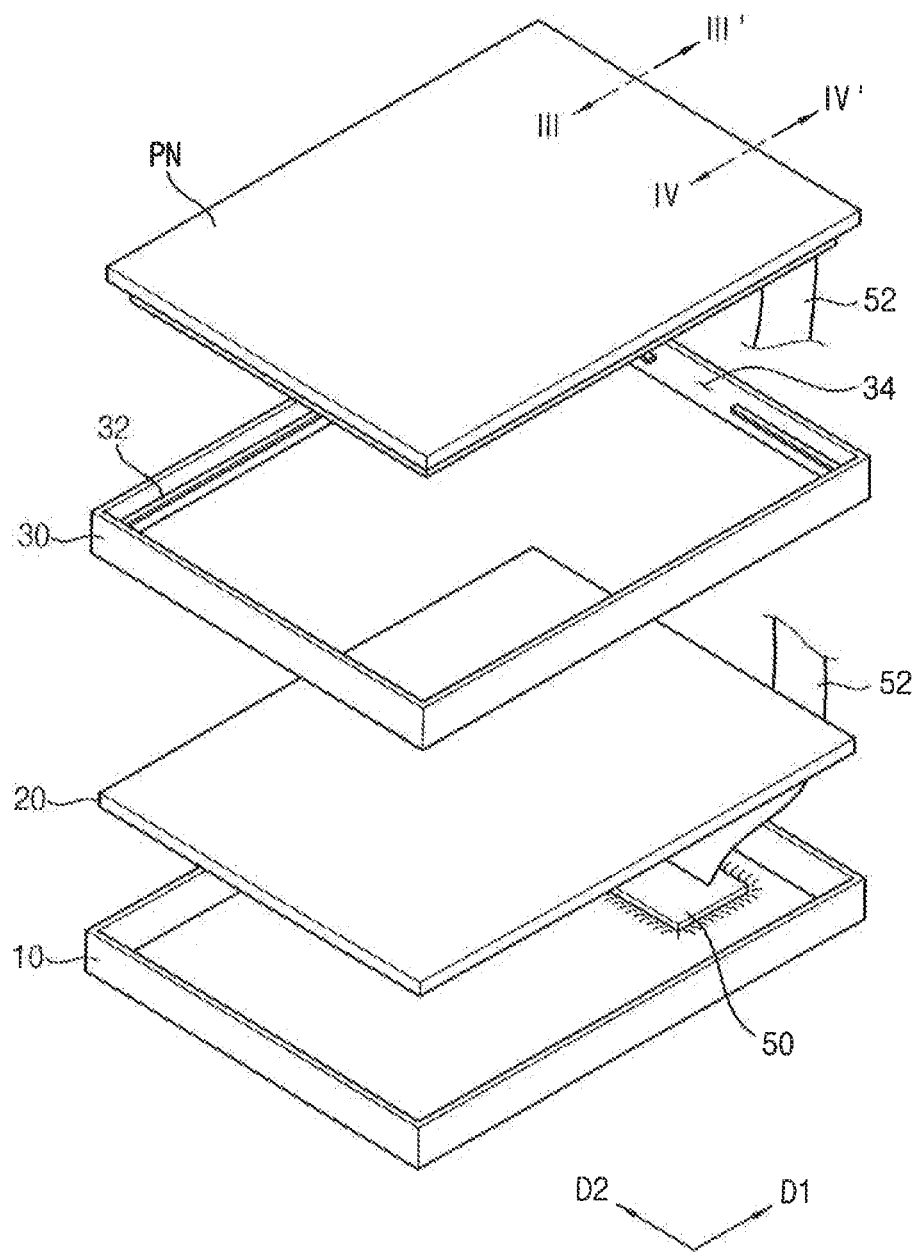
FIG. 12 is an exploded perspective view illustrating a display apparatus according to an exemplary embodiment of the present invention.

FIG. 12 is an exploded perspective view illustrating a display apparatus according to an exemplary embodiment of the present invention.

Referring to FIG. 12, a display apparatus may includes a display panel PN, a bottom chassis 10, a backlight unit 20, a middle frame 30 and a driving part 50.

The display panel PN may display an image. The display panel PN a may be substantially the same as the display panel of FIGS. 1 to 5.

The driving part 50 and the backlight unit 20 may be disposed in the bottom chassis 10. The bottom chassis 10 may include a bottom portion and a side wall extending from a boundary of the bottom portion. The bottom portion and the side wall may form a receiving space. The driving part 50 and the backlight unit 20 may be disposed in the receiving space. A recess (e.g., recess 13 of FIG. 14) of the bottom portion of the bottom chassis 10 may be configured to receive the driving part 50.

The backlight unit 20 may be disposed under the display panel PN, and may supply light to the display panel PN. For example, referring to FIG. 18, the backlight unit 20 may emit a relatively large amount of light at a boundary portion of the backlight unit 20 compared with an amount of light emitted at a central portion of the backlight unit 20 (see, e.g., FIG. 18).

A portion of the display panel PN may be disposed in the middle frame 30, so that the display panel PN is fixed on the bottom chassis 10. The middle frame 30 may include a supporting part 32 to support a boundary of a bottom surface of the display panel PN. A portion of the supporting part 32 may be open to form a connecting part path 34.

The driving part 50 may drive the display panel PN, and may be disposed under the backlight unit 20. The driving part 50 may be electrically connected to the display panel PN through a connecting part 52. The driving part 50 may be disposed in the recess of the bottom portion of the bottom chassis 10.

Figure 13:
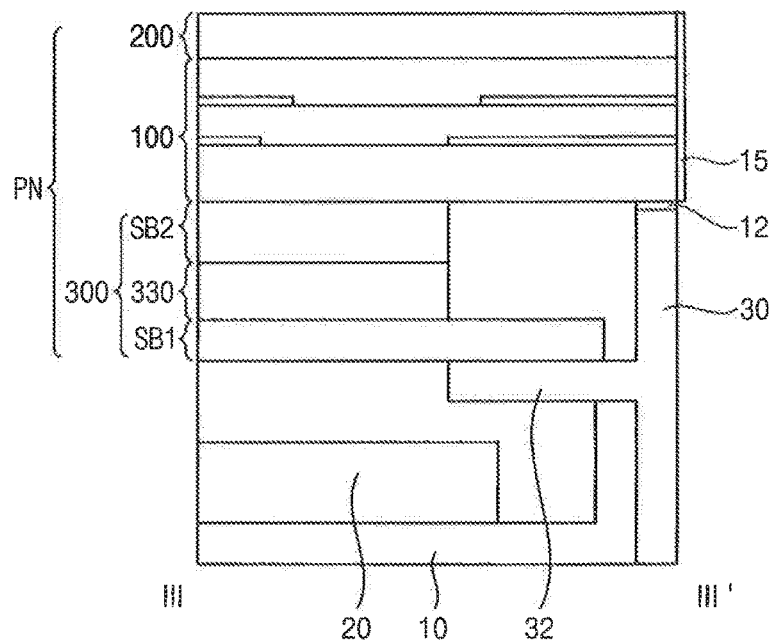
FIG. 13 is a cross-sectional view taken along a line III-III' of FIG. 12.
Figure 14:
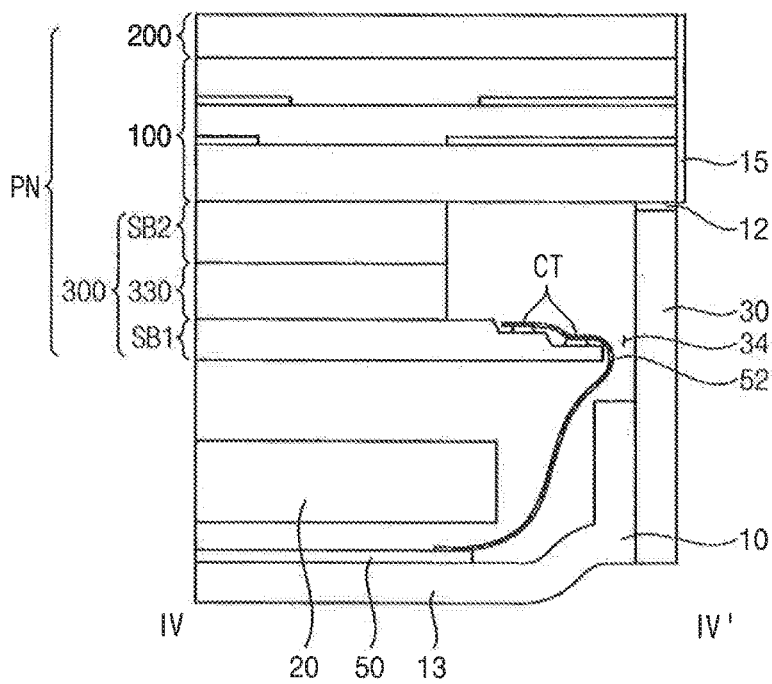
FIG. 14 is a cross-sectional view taken along a line IV-IV' of FIG. 12.

FIG. 13 is a cross-sectional view taken along a line of FIG. 12. FIG. 14 is a cross-sectional view taken along a line IV-IV' of FIG. 12.

Referring to FIGS. 13 and 14, a display apparatus may include a display panel PN, a bottom chassis 10, a backlight unit 20, a middle frame 30 and a driving part 50.

The display panel PN may display an image. The display panel PN may be substantially the same as the display panel of FIGS. 1 to 5. Thus, descriptions of the same elements described with reference to FIGS. 1 to 5 may be omitted.

The display panel PN may include a lower panel 300, a slit layer 100 and a top layer 200.

The lower panel 300 may include a first substrate 5131, a second substrate SB2 facing the first substrate SB1, and a liquid crystal layer 330 disposed between the first substrate SB1 and the second substrate SB2.

The slit layer 100 may be disposed on the lower panel 300. The slit layer 100 may include a first layer, a first pattern configured to form a first slit on the first layer, a second layer disposed on the first pattern, a second pattern configured to form a second slit on the second layer, and a third layer disposed on the second pattern.

The top layer 200 may be disposed on the slit layer 100.

A protecting layer 15 may be disposed on a side surface of the display panel PN. The protecting layer 15 may protect the side surface of the display panel PN, and may include a material which blocks light. For example, the protecting layer 15 may include black colored silicon. The protecting layer 15 may be formed by coating black colored silicon on the side surface of the display panel PN.

The driving part 50 and the backlight unit 20 may be disposed in the bottom chassis 10. The bottom chassis 10 may include a bottom portion and a side wall extending from a boundary of the bottom portion. The bottom portion and the side wall may form a receiving space. The driving part 50 and the backlight unit 20 may be disposed in the receiving space. A recess 13 of the bottom portion of the bottom chassis 10 may be configured to receive the driving part 50.

The backlight unit 20 may be disposed under the display panel PN, and may supply light to the display panel PN. The backlight unit 20 may emit a relatively large amount of light at a boundary portion of the backlight unit 20 compared with an amount of light emitted at a central portion of the backlight unit 20 (see, e.g., FIG. 18).

A portion of the display panel PN may be disposed in the middle frame 30, so that the display panel PN is fixed on the bottom chassis 10. An adhesive layer 12 may be disposed between the middle frame 30 and a slit layer 100 of the display panel PN. The slit layer 100 of the display panel PN may be attached and fixed to the middle frame 30 by the adhesive layer 12. The adhesive layer 12 may include a material which blocks light to prevent light leakage.

An outer surface of the middle frame 30, a side surface of the top layer 200, and a side surface of the slit layer 100 may be disposed in a same plane.

The middle frame 30 may include a supporting part 32 to support a peripheral portion of the display panel PN on which a connecting terminal is disposed (e.g., connecting terminal CT of FIG. 5). A portion of the supporting part 32 may be open to form a connecting part path 34. The driving part 50 may drive the display panel PN, and may be disposed under the backlight unit 20. The driving part 50 may be electrically connected to the display panel PN through a connecting part 52. The driving part 50 may be disposed in the recess 13 of the bottom portion.

According to an exemplary embodiment of the present invention, a display panel may include a lower panel, a top layer larger than the lower panel, and a slit layer disposed between the lower panel and the top layer. An upper surface of the top layer, on which an image is displayed, might not be covered by a receiving container such as a bottom chassis or a middle frame, so that a bezeless display apparatus may be embodied.

Figure 15:
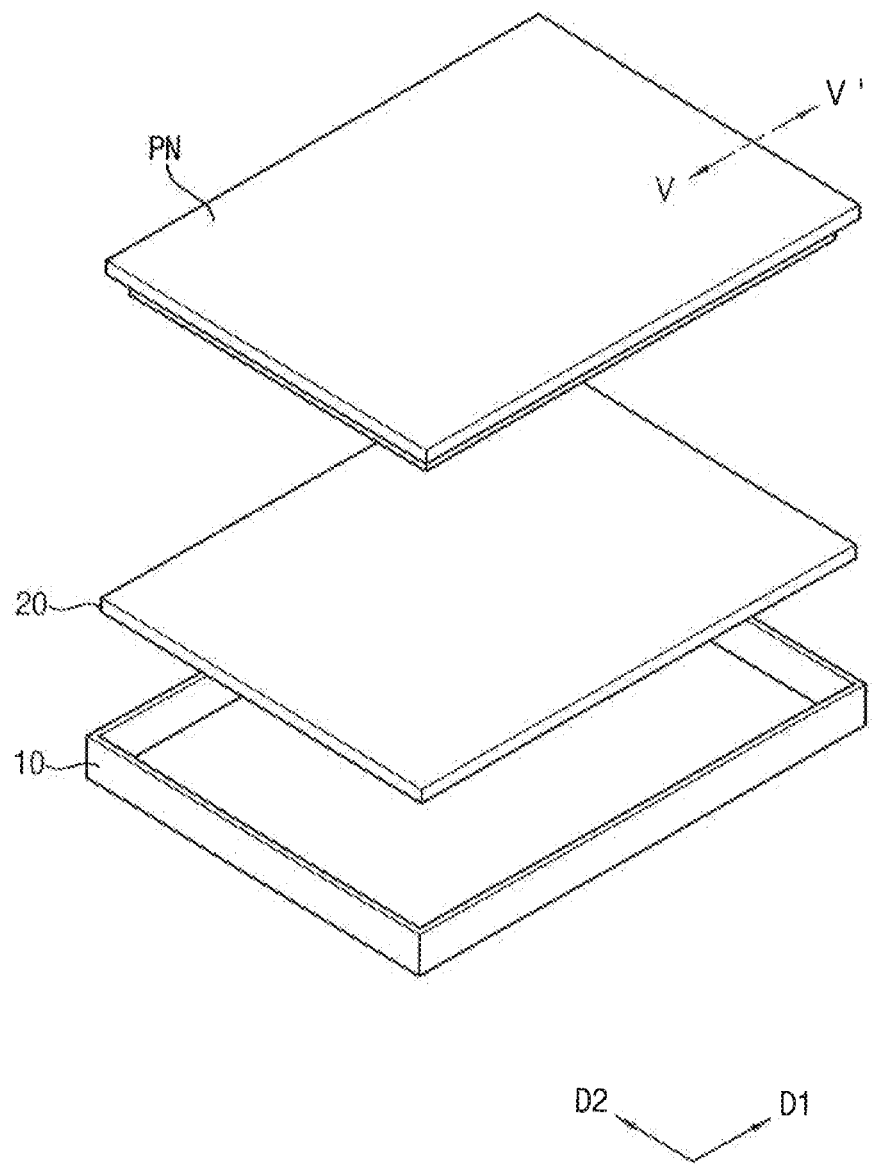
FIG. 15 is an exploded perspective view illustrating a display apparatus according to an exemplary embodiment of the present invention.

FIG. 15 is an exploded perspective view illustrating a display apparatus according to an exemplary embodiment of the present invention.

Referring to FIG. 15, a display panel may include a display panel PN, a bottom chassis 10, and a backlight unit 20.

The display panel PN may display an image. The display panel PN may be substantially the same as the display panel of FIGS. 1 to 5.

The backlight unit 20 and a portion of the display panel PN may be disposed in the bottom chassis 10.

The backlight unit 20 may be disposed under the display panel PN, and may supply light to the display panel PN. The backlight unit 20 may emit a relatively larger amount of light at a boundary portion of the backlight unit 20 compared with an amount of light emitted at a central portion of the backlight unit 20 (see, e.g., FIG. 18).

The display apparatus may include a driving part to drive the display panel PN.

Figure 16:
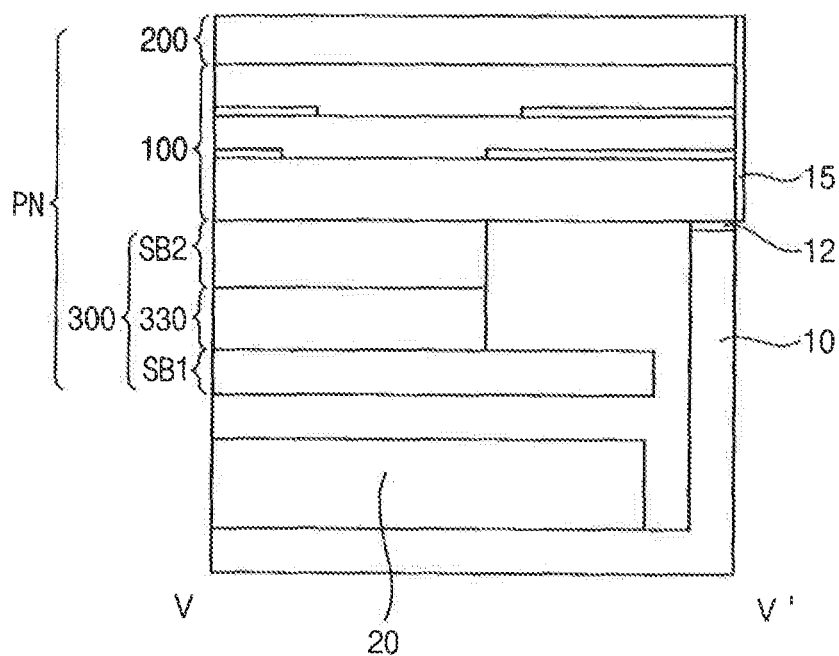
FIG. 16 is a cross-sectional view taken along a line V-V' of FIG. 15.

FIG. 16 is a cross-sectional view taken along a line V-V' of FIG. 15.

Referring to FIG. 16, a display apparatus may include a display panel PN, a receiving container 10, and a backlight unit 20.

The display panel PN may display an image. The display panel PN may be substantially the same as the display panel of FIGS. 1 to 5. Thus, descriptions of the same elements described with reference to FIGS. 1 to 5 may be omitted.

The display panel PN may include a lower panel 300, a slit layer 100 and a top layer 200.

The lower panel 300 may include a first substrate SB1, a second substrate SB2 facing the first substrate SB1, and a liquid crystal layer 330 disposed between the first substrate SB1 and the second substrate SB2.

The slit layer 100 may be disposed on the lower panel 300. The slit layer 100 may include a first layer, a first pattern configured to form a first slit on the first layer, a second layer disposed on the first pattern, a second pattern configured to form a second slit on the second layer, and a third layer disposed on the second pattern.

The top layer 200 may be disposed on the slit layer 100.

A protecting layer 15 may be disposed on a side surface of the display panel PN. The protecting layer 15 may protect the side surface of the display panel PN. The protecting layer 15 may prevent light leakage at the side surface of the display panel PN. The protecting layer 15 may include a material which blocks light and protects the side surface of the display panel PN. For example, the protecting layer 15 may include black colored silicon. The protecting layer 15 may be formed by coating black colored silicon on the side surface of the display panel PN.

According to an exemplary embodiment of the present invention, the protecting layer 15 may be disposed on the side surface of the display panel PN, so that a bezelless display apparatus may be embodied.

The backlight unit 20 and the lower panel 300 of the display panel PN may be disposed in the receiving container 10. Thus, the slit layer 100 and the top layer 200 of the display panel PN may be exposed to an outside of the display panel. An adhesive layer 12 may be disposed between the receiving container 10 and a slit layer 100 of the display panel PN. The slit layer 100 of the display panel PN may be attached and fixed to the receiving container 10 by the adhesive layer 12. The adhesive layer 12 may include a material which blocks light to prevent light leakage.

The receiving container 10 may include a bottom portion and a side wall extending from the bottom portion. An outer surface of the side wall, a side surface of the top layer 200, and a side surface of the slit layer 100 may be disposed in a same plane.

The backlight unit 20 may be disposed under the display panel PN, and may supply light to the display panel PN. The backlight unit 20 may emit a relatively large amount of light at a boundary portion of the backlight unit 20 compared with an amount of light emitted at a central portion of the backlight unit 20 (see, e.g. FIG. 18).

Figure 17:
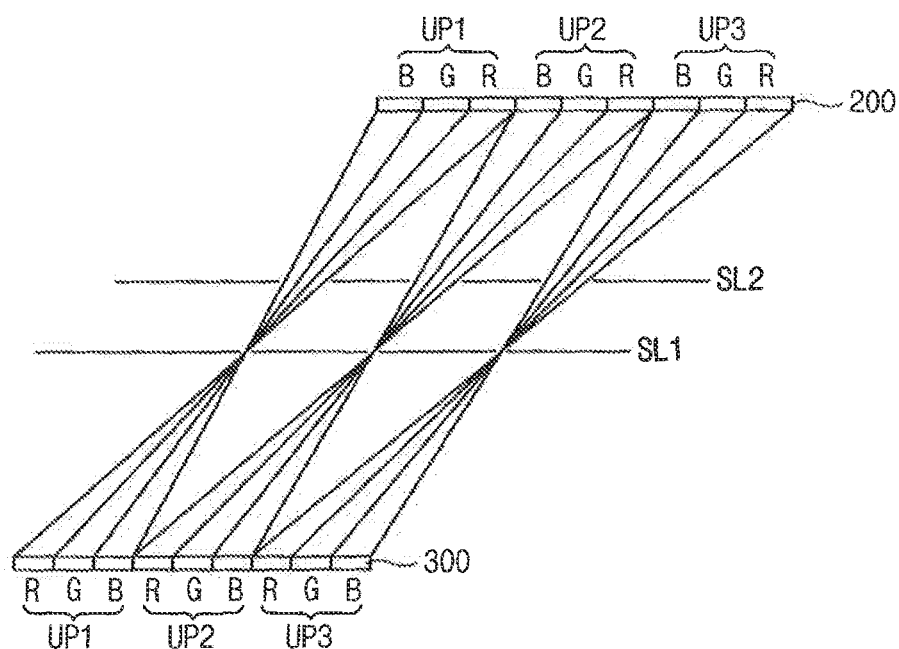
FIG. 17 is a cross-sectional view illustrating an example of light path of a display panel according to exemplary embodiments of the present invention.

FIG. 17 is a cross-sectional view briefly illustrating an example of light path of a display panel according to exemplary embodiments of the present invention.

Referring to FIG. 17, a lower panel 300 may include a first unit pixel UP1, a second unit pixel UP2, and a third unit pixel UP3. Each of the first to third unit pixels UP1 to UP3 may include red, green and blue pixels R, tri B disposed in order.

An image disposed on the first to third unit pixels UP1 to UP3 may be projected onto the top layer 200 through a first slit SL1 and a second slit SL2. The first to third unit pixels UP1 to UP3 may be projected onto the top layer 200 in order. The image of each of unit pixels may pass through the first and second slits SL1 and SL2, and the blue, green and red pixels may be projected in order.

Light of the image projected onto the lower panel 300 may form a focus on the first slit SL1. A summed distance from the first slit SL1 to the second slit SL2 and from the second slit SL2 to the top layer 200 may be larger than a distance from the lower panel 300 to the first slit SL1, so that the image projected onto the top layer 200 may be larger than the image projected onto the lower panel 300.

Figure 18:
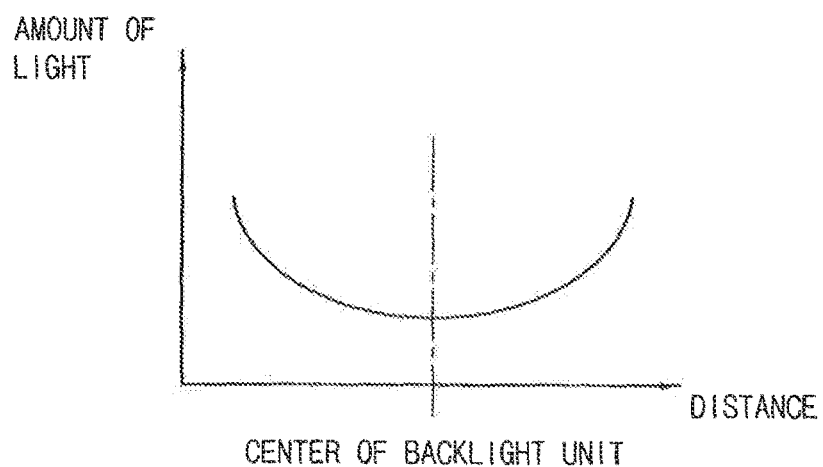
FIG. 18 is a graph illustrating a distribution of light of a backlight unit of a display apparatus according to exemplary embodiments of the present invention.

FIG. 18 is a graph illustrating a distribution of a quantity of light of a backlight unit of a display apparatus according to exemplary embodiments of the present invention.

Referring to FIG. 18, from a central portion of a display panel to a peripheral portion of the display panel, a light path from a lower panel to a top layer is further inclined with respect to a perpendicular direction of the display panel, so that an amount of light emitted from a backlight unit may increase from the central portion of a display panel to the peripheral portion of the display panel. Thus, uniform brightness through the whole display panel may be obtained.

According to an exemplary embodiment of the present invention, a display panel may include a lower panel, a top layer larger than the lower panel, and a slit layer disposed between the lower panel and the top layer. An upper surface of the top layer, on which an image may be displayed, might not be covered by a receiving container such as a bottom chassis or a middle frame, so that a bezelless display apparatus may be embodied.

The slit layer may include first to third walls. When light of the image displayed on the lower panel passes through the slit layer and is projected onto the top layer, the light passing through the slit layer may pass an empty space (e.g., an air layer), so that a loss of light efficiency caused by scattering or diffusing may be decreased. Thus, display quality may be increased.

The top layer may include a color filter and might not include a translucent material, so that a loss of light efficiency caused by scattering or diffusing may be decreased. Thus, transmittance may be increased.

The slit layer may include a first layer smaller than the top layer, so that a height of a side wall of a receiving container of a display apparatus having the display panel may be decreased according to a first thickness of the first layer, so that a whole thickness of the display apparatus may be decreased.

While the invention has been particularly shown and described with reference to exemplary embodiments thereof, it will be understood by those of ordinary skill in the art that various changes in form and detail may be made therein without departing from the spirit and scope of the present invention.

What is claimed is:

1. A display panel, comprising:
   a lower panel configured to display an image, wherein the lower panel comprises a plurality of unit pixels;
   a slit layer disposed on the lower panel, wherein the slit layer comprises a first pattern configured to form a first slit corresponding to each of the plurality of unit pixels and a second pattern configured to form a second slit corresponding to the first slit, and wherein the slit layer is configured to project an image through the first slit and the second slit; and a top layer disposed on the slit layer, wherein the top layer is larger than the lower panel in a plan view, wherein the first pattern configured to form the first slit and the second pattern configured to form the second slit are spaced apart from the top layer, and wherein the top layer is configured to have the image projected thereon.

2. The display panel of claim 1, wherein the lower panel further comprises a connecting terminal configured to receive a signal for driving the lower panel, wherein the connecting terminal is disposed on a peripheral area of the display panel, wherein the peripheral area is configured to not display the image, and wherein a boundary region of the top layer is configured to overlap the peripheral area of the lower panel.

3. The display panel of claim 2, wherein at a central portion of the display panel, light of the image displayed on the lower panel is projected onto the top layer along a direction substantially perpendicular to a plane of the lower panel, and wherein at the peripheral area of the display panel, the light of the image displayed on the lower panel is projected onto the top layer along an angle that is inclined with respect to the plane of the lower panel.

4. The display panel of claim 1, wherein the slit layer comprises:

a first layer disposed on the lower panel between the lower panel and the first pattern;

a second layer disposed on the first layer between the first pattern and the second pattern; and a third layer disposed on the second layer between the second pattern and the top layer, wherein the third layer separates the second pattern from the top layer, and wherein the second layer has a different thickness from thicknesses of the first and third layers.

5. The display panel of claim 4, wherein the first and second patterns are metal thin film patterns or printed ink patterns.

6. The display panel of claim 5, wherein the first layer of the slit layer has a first thickness, the second layer has a second thickness, the third layer has a third thickness, and a sum of the second thickness and the third thickness is larger than the first thickness.

7. The display panel of claim 1, wherein the top layer comprises a translucent material.

8. The display panel of claim 1, wherein the lower panel comprises a first substrate, a second substrate facing the first substrate, and a liquid crystal layer disposed between the first substrate and the second substrate, and the second substrate comprises a second base substrate and a color filter disposed on the second base substrate.

9. The display panel of claim 8, wherein the unit pixel comprises a first pixel, a second pixel and a third pixel, a first color filter is disposed corresponding to the first pixel, a second color filter is disposed corresponding to the second pixel, a third color filter is disposed corresponding to the third pixel, and the display panel is configured to display the image on the lower panel corresponding to the first to third pixels, and the display panel is configured to project the image through the first and second slits onto the top layer.

10. A display apparatus, comprising:

a display panel; and a receiving container receiving the display panel, wherein the display panel comprises:

a lower panel configured to display an image, and comprising a plurality of unit pixels;

a slit layer disposed on the lower panel, and comprising a first pattern configured to form a first slit corresponding to each of the plurality of unit pixels and a second pattern configured to form a second slit corresponding to the first slit; and a top layer disposed on the slit layer on which the image through the slit layer is projected, wherein the first pattern configured to form the first slit and the second pattern configured to form the second slit are spaced apart from the top layer, and wherein the top layer is larger than the lower panel in a plan view, and the receiving container comprises a bottom portion and a side wall extending from a boundary of the bottom portion, and an outer surface of the side wall and a side surface of the top layer of the display panel are disposed in a same plane.

11. The display apparatus of claim 10, further comprising an adhesive layer disposed between the receiving container and the display panel, wherein the adhesive layer is configured to attach the display panel to the receiving container.

12. The display apparatus of claim 10, further comprising a protecting layer disposed on a side surface of the display panel, wherein the protecting layer is configure to block light and to protect the display panel.

13. The display apparatus of claim 12, wherein the protecting layer comprises a black colored silicon.

14. The display apparatus of claim 10, further comprising a driving part configured to drive the display panel, and the lower panel of the display panel further comprises a connecting terminal disposed on a peripheral area of the display panel, wherein the peripheral area is disposed at a boundary of the display panel and the image is not displayed thereon, and the driving part is electrically connected to the connecting terminal through a connecting part.

15. The display apparatus of claim 10, wherein the slit layer comprises:

a first layer disposed on the lower panel between the lower panel and the first pattern;

a second layer disposed on the first layer between the first pattern and the second pattern; and a third layer disposed on the second layer between the second pattern and the top layer, wherein the third layer separates the second pattern from the top layer, and wherein the second layer has a different thickness from thicknesses of the first and third layers.

16. A method of manufacturing a display panel, comprising:

forming a lower panel for displaying an image;

forming a slit layer, for controlling a light path of the image, on the lower panel; and forming a top layer, on which the image is projected, on the slit layer, the top layer being lager than the lower panel in a plan view, wherein forming the slit layer comprises:

forming a first layer having a first thickness;

forming a first pattern having a first slit on the first layer;

forming a second layer having a second thickness on the first layer;

forming a second pattern having a second slit on second layer, the second slit being larger than the first slit, wherein the first pattern having the first slit and the second pattern having the second slit are spaced apart from the top layer; and forming a third layer having a third thickness on the second pattern.

17. The method of claim 16, wherein forming the first pattern comprises forming a metal layer on the first layer, and the first pattern is formed having the first slit by patterning the metal layer.

\* \* \* \* \*